United States Patent
Oda et al.

(10) Patent No.: US 9,378,056 B2
(45) Date of Patent: Jun. 28, 2016

(54) MANAGEMENT SERVER, AND VIRTUAL MACHINE MOVE CONTROL METHOD

(71) Applicant: FUJITSU LIMITED, Kawasaki-shi, Kanagawa (JP)

(72) Inventors: Yoshikazu Oda, Gifu (JP); Kenichi Shimazaki, Yokohama (JP); Yasuhide Tobo, Chita (JP); Yukihisa Miyagawa, Tsushima (JP); Yuki Nojiri, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 248 days.

(21) Appl. No.: 13/868,474

(22) Filed: Apr. 23, 2013

(65) Prior Publication Data
US 2013/0346973 A1    Dec. 26, 2013

(30) Foreign Application Priority Data
Jun. 25, 2012    (JP) .................... 2012-142402

(51) Int. Cl.
*G06F 9/455* (2006.01)
*G06F 9/48* (2006.01)
*G06F 9/50* (2006.01)

(52) U.S. Cl.
CPC ............ *G06F 9/4856* (2013.01); *G06F 9/5088* (2013.01)

(58) Field of Classification Search
None
See application file for complete search history.

(56) References Cited

U.S. PATENT DOCUMENTS

| 2008/0295096 A1* | 11/2008 | Beaty et al. .................. 718/1 |
| 2009/0300173 A1* | 12/2009 | Bakman et al. .............. 709/224 |
| 2009/0307597 A1* | 12/2009 | Bakman .......................... 715/736 |
| 2009/0327781 A1* | 12/2009 | Tripathi .......................... 713/324 |
| 2010/0169253 A1* | 7/2010 | Tan ...................................... 706/21 |
| 2010/0175070 A1* | 7/2010 | Baba ............................... 718/105 |
| 2010/0242045 A1* | 9/2010 | Swamy et al. ................ 718/104 |
| 2011/0099267 A1* | 4/2011 | Suri et al. ....................... 709/224 |
| 2012/0131174 A1* | 5/2012 | Ferris et al. ................... 709/224 |
| 2012/0137293 A1* | 5/2012 | Bozek et al. ...................... 718/1 |
| 2012/0198447 A1* | 8/2012 | Osogami et al. ................ 718/1 |
| 2012/0246638 A1* | 9/2012 | He et al. ............................ 718/1 |
| 2013/0086272 A1* | 4/2013 | Chen et al. ..................... 709/226 |
| 2013/0263117 A1* | 10/2013 | Konik et al. ...................... 718/1 |

FOREIGN PATENT DOCUMENTS

| JP | 2005-115653 | 4/2005 |
| JP | 2009-146161 | 7/2009 |
| JP | 2010-117760 | 5/2010 |

OTHER PUBLICATIONS

Office Action issued by the Japanese Patent Office on Oct. 6, 2015 in related Japanese patent application No. 2012-142402.

(Continued)

*Primary Examiner* — Emerson Puente
*Assistant Examiner* — Mehran Kamran
(74) *Attorney, Agent, or Firm* — Staas & Halsey LLP

(57) ABSTRACT

A program that performs a virtual machine move control predicts a resource shortage, predicted to occur for a predetermined time period, of a physical server that includes multiple virtual machines and that is included in a management server; specifies a virtual machine that eliminate the resource shortage by moving, at a time point at which the predicted resource shortage occurs, among the virtual machine included in the physical server, for which the resource shortage is predicted, to another physical server; and moves the specified virtual machine to the other physical server on the basis of the resource usage of the specified virtual machine for the predetermined time period and on the basis of a time point that is associated with the resource usage.

4 Claims, 26 Drawing Sheets

(56) References Cited

OTHER PUBLICATIONS

Satoshi Tazoe et al., "An Exact Algorithm for the Min-Cost Virtual Machine Reassignment problem", 2009 Information Processing Society of Japan, vol. 2009-MPS-76 No. 11, vol. 2009-BIO-19 No. 11, Dec. 17, 2009, 13 pages.

* cited by examiner

| FUTURE DATE AND TIME (1121a) | PHYSICAL SERVER NAME (1121b) | VIRTUAL MACHINE NAME (1121c) | PREDICTED CPU USAGE (1121d) |
|---|---|---|---|
| 2011/10/12 00:00:00 | Server1 | Gest001 | 70 |
| 2011/10/12 00:05:00 | Server1 | Gest001 | 65 |
| 2011/10/12 00:10:00 | Server1 | Gest001 | 10 |
| ⋮ | ⋮ | ⋮ | ⋮ |

| FUTURE DATE AND TIME (1122a) | PHYSICAL SERVER NAME (1122b) | PREDICTED CPU USAGE (1122c) |
|---|---|---|
| 2011/10/12 00:00:00 | Server1 | 250 |
| 2011/10/12 00:00:00 | Server2 | 312 |
| 2011/10/12 00:00:00 | Server3 | 265 |
| ⋮ | ⋮ | ⋮ |

FIG.7

| 114a | 114b | 114c | 114d | 114e |
|---|---|---|---|---|
| MIGRATION DATE AND TIME | MIGRATION SOURCE PHYSICAL SERVER NAME | MIGRATION SOURCE VIRTUAL MACHINE NAME | MIGRATION DESTINATION PHYSICAL SERVER NAME | EXECUTION STATE |
| 2011/10/12 5:25:00 | Server1 | Gest1-1 | Server5 | EXECUTION COMPLETION |
| 2011/10/12 16:40:00 | Server2 | Gest2-4 | Server4 | PRE-EXECUTION |

| RESOURCE TO BE COLLECTED \ COLLECTION TIME | 0:00 | 0:05 | 0:10 | 0:15 |
|---|---|---|---|---|
| CPU USAGE ON 11/7 | 1000 | 1500 | 1200 | 1100 |
| CPU USAGE ON 11/8 | 1100 | 1300 | 1000 | 1250 |
| CPU USAGE ON 11/9 | 1150 | 1200 | 1250 | 1050 |
| ABSOLUTE DIFFERENCE SUM | 300 (100+150+50) | 600 (200+300+100) | 500 (200+50+250) | 400 (150+50+200) |

→ TOTAL SUM OF ABSOLUTE DIFFERENCE SUMS: 1800

FIG.8B

| RESOURCE TO BE COLLECTED \ COLLECTION TIME | 0:00 | 0:05 | 0:10 | 0:15 |
|---|---|---|---|---|
| CPU USAGE ON 10/20 (THURSDAY) | 800 | 1200 | 1100 | 1300 |
| CPU USAGE ON 10/27 (THURSDAY) | 1000 | 1150 | 1000 | 1300 |
| CPU USAGE ON 11/3 (THURSDAY) | 950 | 1250 | 1200 | 1400 |
| ABSOLUTE DIFFERENCE SUM | 400 (200+150+50) | 200 (50+50+100) | 400 (100+100+200) | 200 (0+100+100) |

TOTAL SUM OF ABSOLUTE DIFFERENCE SUMS: 1200

FIG.8C

| COLLECTION TIME<br>RESOURCE TO BE COLLECTED | 0:00 | 0:05 | 0:10 | 0:15 |
|---|---|---|---|---|
| CPU USAGE ON 8/10 | 1000 | 1500 | 1100 | 1100 |
| CPU USAGE ON 9/10 | 1250 | 1300 | 1400 | 1250 |
| CPU USAGE ON 10/10 | 1100 | 1200 | 1250 | 1450 |
| ABSOLUTE DIFFERENCE SUM | 500<br>(250+100+150) | 600<br>(200+300+100) | 600<br>(300+150+150) | 700<br>(150+350+200) |

→ TOTAL SUM OF ABSOLUTE DIFFERENCE SUMS: 2400

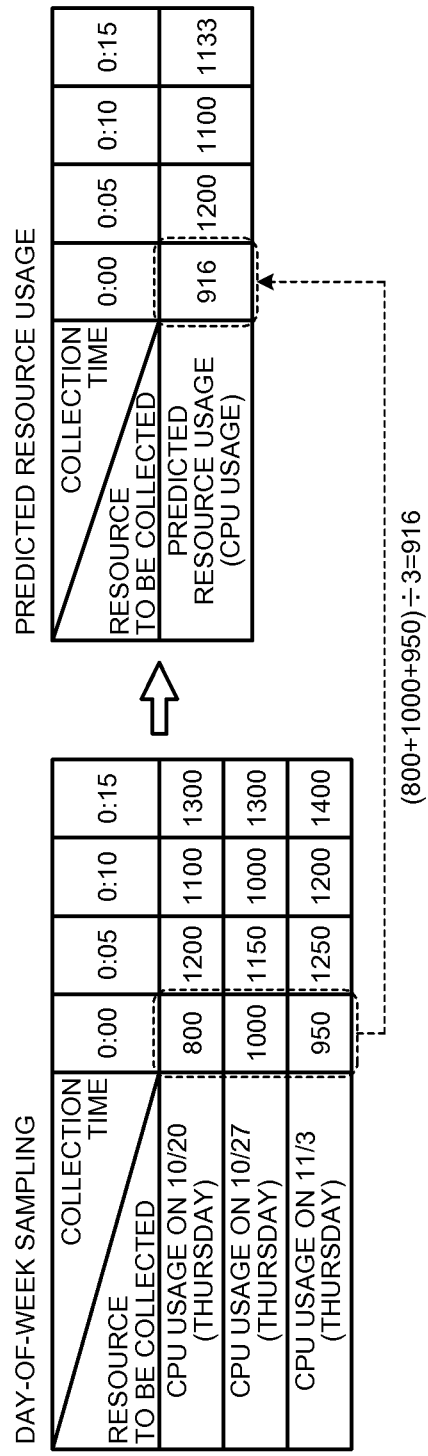

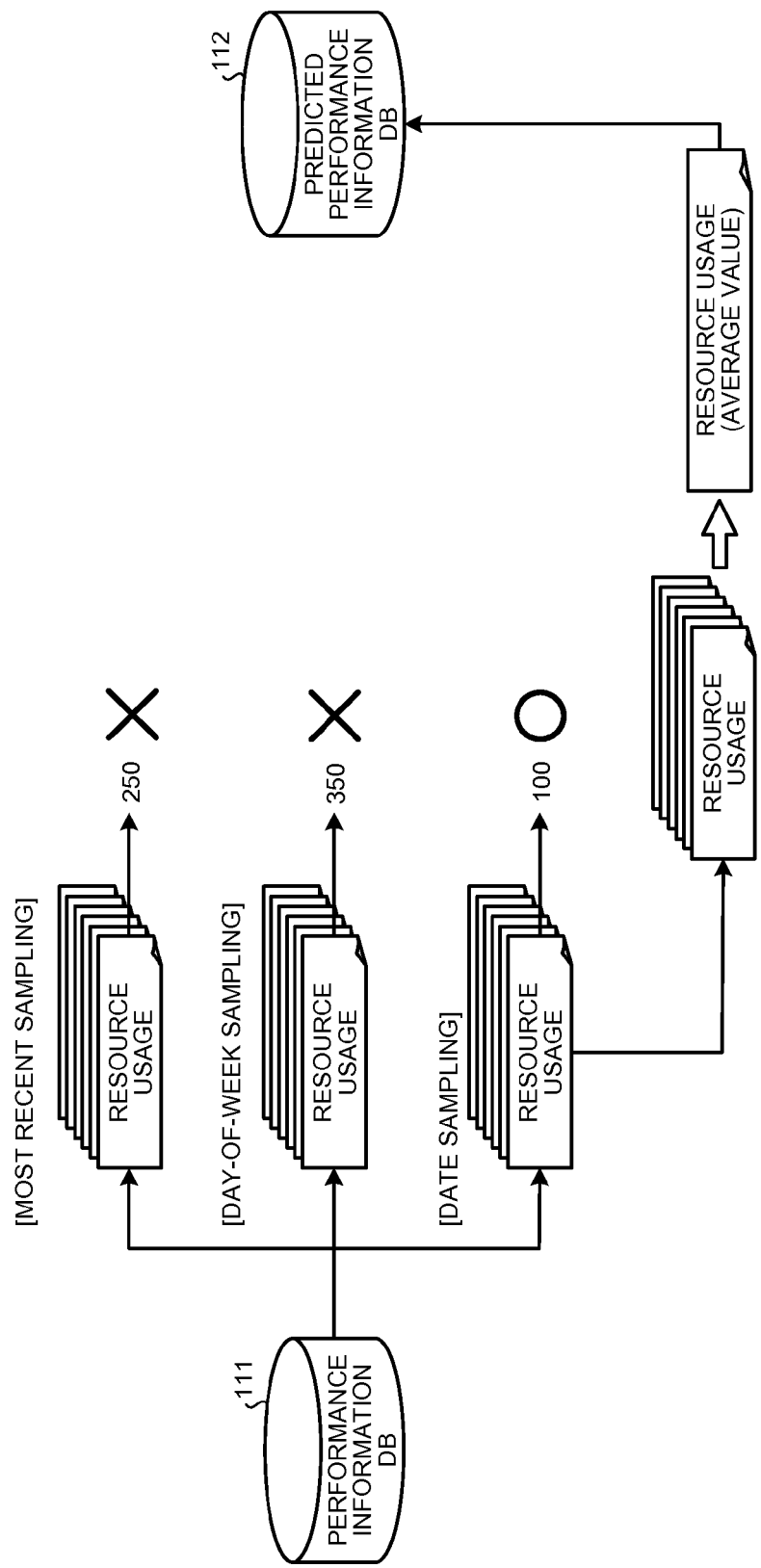

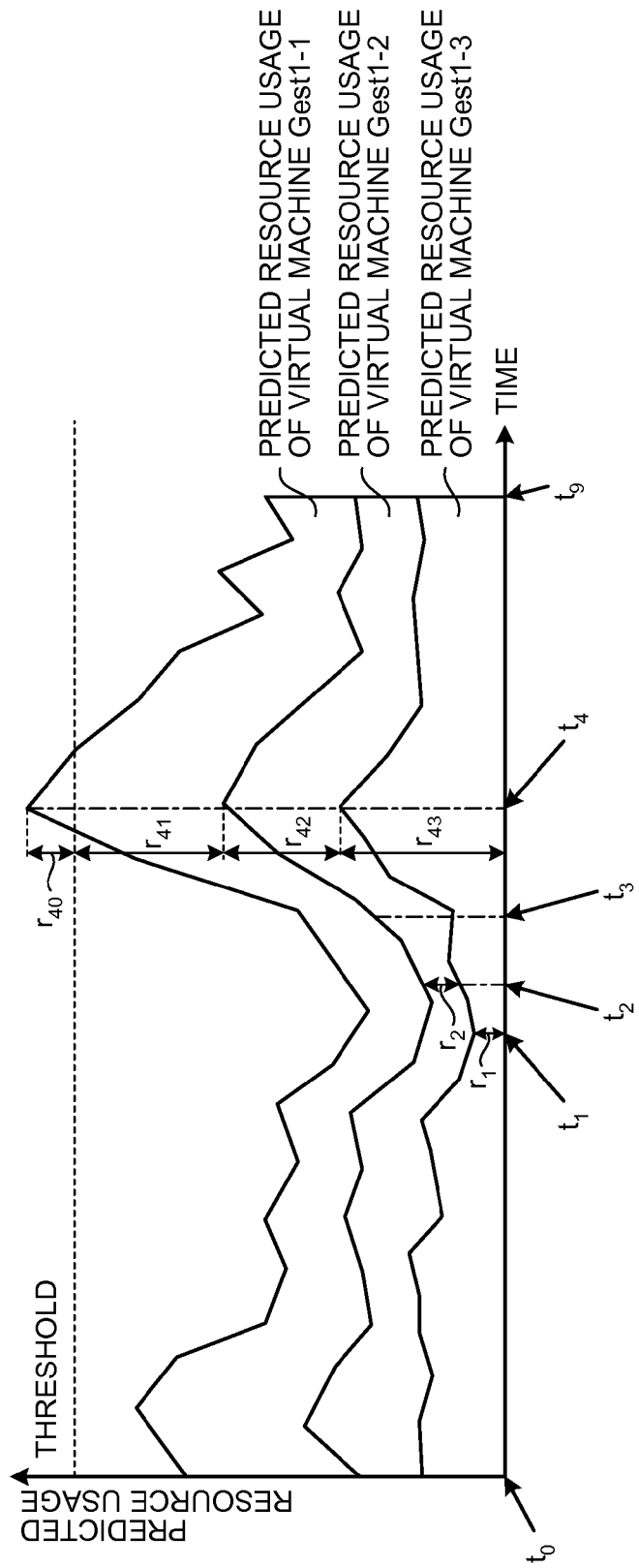

FIG.13

| MIGRATION DATE AND TIME | MIGRATION SOURCE PHYSICAL SERVER NAME | MIGRATION SOURCE VIRTUAL MACHINE NAME | MIGRATION DESTINATION PHYSICAL SERVER NAME | EXECUTION STATE |
|---|---|---|---|---|
| 2011/10/12 5:25:00 | Server1 | Gest1-2 | Server5 | PRE-EXECUTION |
| 2011/10/12 5:25:00 | Server2 | Gest2-1 | Server4 | PRE-EXECUTION |
| 2011/10/12 5:25:00 | Server3 | Gest3-1 | | |
| 2011/10/12 5:25:00 | Server4 | Gest4-2 | | |
| | | | | |

FIG.16

| MIGRATION DATE AND TIME | MIGRATION SOURCE PHYSICAL SERVER NAME | MIGRATION SOURCE VIRTUAL MACHINE NAME | MIGRATION DESTINATION PHYSICAL SERVER NAME | EXECUTION STATE |
|---|---|---|---|---|
| 2011/10/12 5:25:00 | Server1 | Gest1-2 | Server5 | EXECUTION COMPLETION |
| 2011/10/12 6:30:00 | Server2 | Gest2-1 | Server4 | EXECUTION COMPLETION |
| 2011/10/12 6:25:00 | Server3 | Gest3-1 | Server6 | EXECUTION COMPLETION |
| 2011/10/12 7:28:00 | Server4 | Gest4-2 | Server7 | PRE-EXECUTION |
| | | | | |

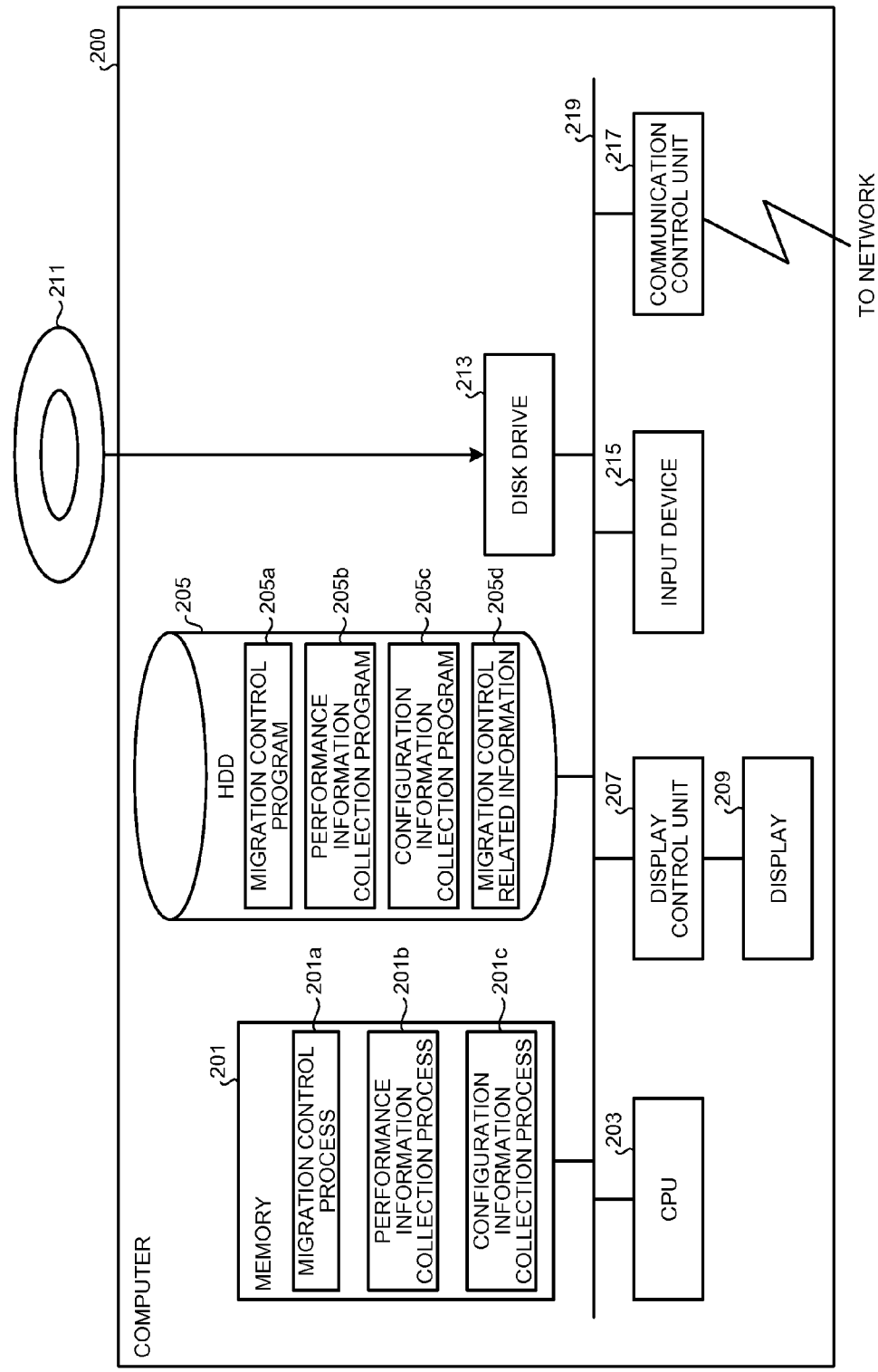

MANAGEMENT SERVER, AND VIRTUAL MACHINE MOVE CONTROL METHOD

CROSS-REFERENCE TO RELATED APPLICATIONS

This application is based upon and claims the benefit of priority of the prior Japanese Patent Application No. 2012-142402, filed on Jun. 25, 2012, the entire contents of which are incorporated herein by reference.

FIELD

The embodiment discussed herein is related to a program, a management server, and a virtual machine move control method.

BACKGROUND

There is a known virtualization technology in which a hypervisor manages the machine resources of a single server and multiple virtual machines are operated in parallel on the server. In this virtualization technology, in order for the server to efficiently use the machine resources of the server, the management server that manages the server moves a running virtual machine from one server to another server in an uninterrupted manner. This is referred to as a "live migration".

In a live migration, the management server copies a memory image of the move source to the move destination. Because the memory in the running virtual machine continues to be changed, strictly speaking, it is inevitable that the virtual machine temporarily fails (stops) at some point while the management server is performing the copying. This temporary downtime (hereinafter, referred to as a "downtime") usually lasts for several seconds; however, it depends on the usage state of the resource of the virtual machine that is to be moved. Consequently, if the virtual machine is moved when a large amount of resource is being used, it takes a long time, e.g., several seconds or more.

Consequently, there is a disclosed technology for avoiding the occurrence of a failure for a long time due to a live migration. In this technology, the management server uses a high-degree equation to predict the resource usage of a physical server that will be used in the future. When the management server predicts the occurrence of a resource shortage, if a time zone is present where the resource usage does not exceed a move threshold for defining an upper limit of the movement related to a load and if a move time of the move virtual machine that is moved is included in this time zone, the management server moves the move virtual machine in this time zone.

Patent Document 1: Japanese Laid-open Patent Publication No. 2010-117760

However, even when it is predicted that the resource usage in the physical server will run short, if no time zone is present in which the resource usage of the virtual machine running on the physical server below the move threshold, the moving of the virtual machine running on the physical server is limited. Consequently, there is a problem in that the operation of the physical server whose resource usage is predicted to be in short supply may possibly become unstable in the future.

SUMMARY

According to an aspect of an embodiment, a computer readable storage medium stores a program. The program causes a computer to execute a process including predicting a resource shortage, predicted to occur for a predetermined time period, of a physical machine that includes multiple virtual machines; specifying a virtual machine that eliminate the resource shortage by moving, at a time point at which the predicted resource shortage occurs, among the virtual machine, which is included in the physical machine for which the resource shortage is predicted, to another physical machine; and moving the specified virtual machine to the other physical machine on the basis of the resource usage of the specified virtual machine for the predetermined time period and on the basis of a time point that is associated with the resource usage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a schematic diagram illustrating an example of the data structure of a virtual-machine predicted information table;

FIG. 6 is a schematic diagram illustrating an example of the data structure of a physical-server predicted information table;

FIG. 7 is a schematic diagram illustrating an example of the data structure of a migration information DB;

FIG. 8A is a schematic diagram illustrating an example of calculating an absolute difference sum of the most recent sampling;

FIG. 8B is a schematic diagram illustrating an example of calculating an absolute difference sum of day-of-week sampling;

FIG. 8C is a schematic diagram illustrating an example of calculating an absolute difference sum of date sampling;

FIG. 9 is a schematic diagram illustrating an example of calculating predicted resource usage;

FIG. 10 is a schematic diagram illustrating the flow of creating predicted performance information in a predicted performance information creating unit;

FIG. 11 is a schematic diagram illustrating determination of a migration source performed by a migration source determining unit;

FIG. 13 is a schematic diagram illustrating an example of searching the migration information DB performed by the migration destination determining unit;

FIG. 16 is a schematic diagram illustrating an example of searching the migration information DB performed by a migration execution requesting unit;

FIG. 26 is a block diagram illustrating an example of a computer that executes a migration control program.

DESCRIPTION OF EMBODIMENT

Preferred embodiment of the present invention will be explained with reference to accompanying drawings.

The present invention is not limited to the embodiment.

Configuration of an Information Processing System According to an Embodiment

Figure 1:
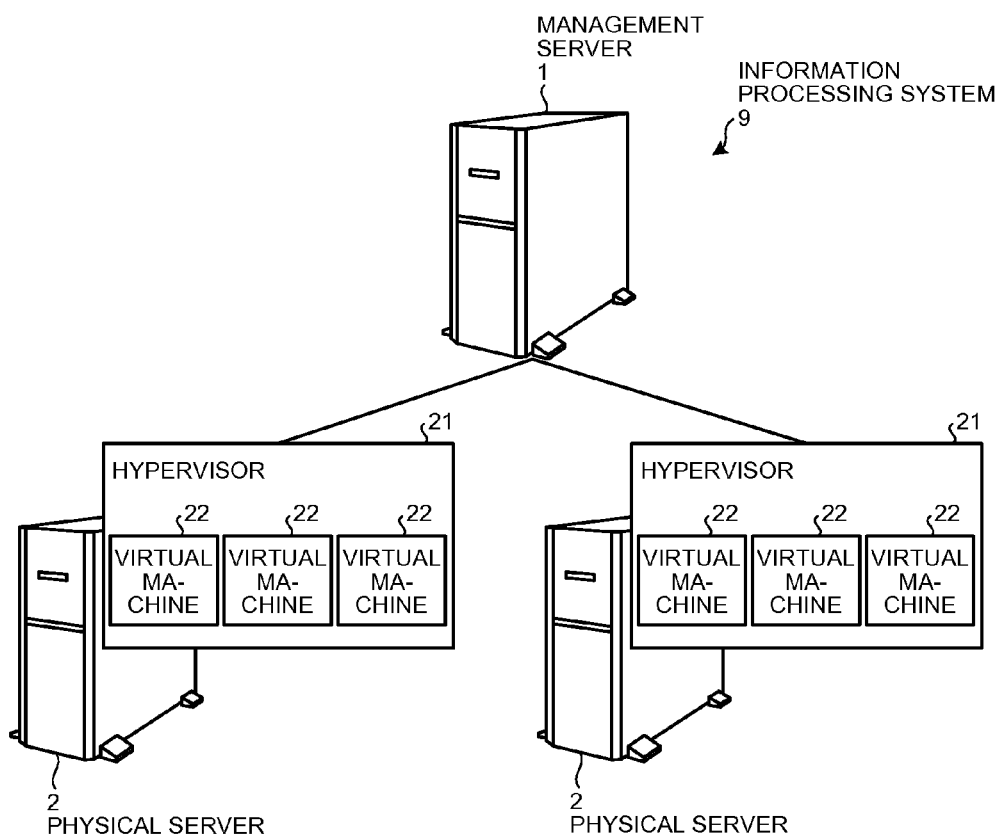
FIG. 1 is a schematic diagram illustrating the overall configuration of an information processing system according to an embodiment.

FIG. 1 is a schematic diagram illustrating the overall configuration of an information processing system according to an embodiment. As illustrated in FIG. 1, an information processing system 9 includes a management server 1 and multiple physical servers 2. Each of the physical servers 2 includes a single hypervisor 21 and multiple virtual machines 22. The hypervisor 21 is software needed to operate the virtual machines 22 and allocates the resources, such as a central processing unit (CPU), a memory, and the like, mounted on the physical server 2 to each of the virtual machines 22.

The management server 1 predicts a time point at which the resource becomes insufficient in the physical server 2, which includes the multiple virtual machines 22; finds a time point when the downtime of the system can be minimized before the predicted time point is reached; and automatically performs the live migration at the time point that was found. The time point at which the live migration is performed is the time point when, for example, the resource usage of the virtual machine to be moved is at a minimum. Furthermore, the virtual machine to be moved is preferably a virtual machine that has the earliest time point at which the resource usage thereof is at a minimum. Hereinafter, the live migration is referred to as "migration".

Configuration of the Management Server According to the Embodiment

Figure 2:
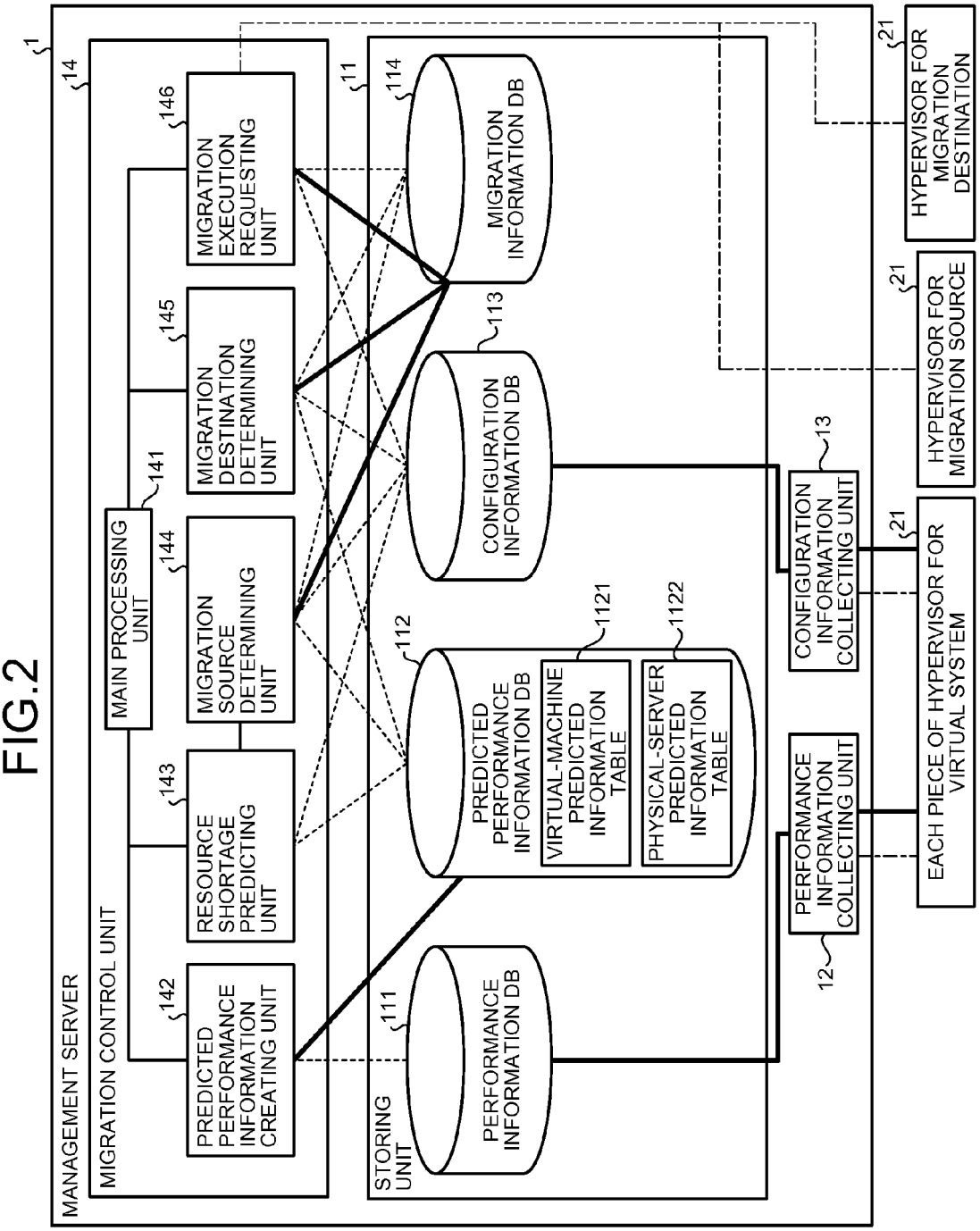
FIG. 2 is a functional block diagram illustrating the configuration of a management server according to the embodiment.

The configuration of the management server 1 will be described with reference to FIG. 2. FIG. 2 is a functional block diagram illustrating the configuration of a management server according to the embodiment. As illustrated in FIG. 2, the management server 1 includes a storing unit 11, a performance information collecting unit 12, a configuration information collecting unit 13, and a migration control unit 14.

The storing unit 11 is a storage device corresponding to a nonvolatile semiconductor memory device, such as a flash memory, a ferroelectric random access memory (FRAM) (registered trademark), and the like. The storing unit 11 includes a performance information DB (database) 111, a predicted performance information DB 112, a configuration information DB 113, and a migration information DB 114.

The performance information DB 111 stores therein actual performance information that is collected for each virtual machine 22 from the hypervisor 21. The performance information mentioned here is, for example, CPU usage (MHz), memory usage (byte), or disk usage (byte/sec); however, the performance information is not limited thereto. Namely, any usage may also be used for the performance information as long as the resource usage of the physical server 2 can be used for each virtual machine 22. In the embodiment, it is assumed that CPU usage is collected by the performance information DB 111 as performance information. Furthermore, in the description below, the CPU usage is taken as being synonymous with resource usage. The performance information DB 111 is created by the performance information collecting unit 12, which will be described later.

The predicted performance information DB 112 includes a virtual-machine predicted information table 1121 and a physical-server predicted information table 1122. The virtual-machine predicted information table 1121 stores therein, for each virtual machine 22, resource usage that is predicted to be used for a predicted time period starting from the predicted start date and time and ending at the predicted end date and time. The physical-server predicted information table 1122 stores therein, for each physical server, resource usage that is predicted to be used in the future. Furthermore, the predicted performance information DB 112 is created by a predicted performance information creating unit 142, which will be described later.

The configuration information DB 113 stores therein configuration information on the system. The configuration information contains the physical server 2 and the virtual machines 22 in an associated manner and contains the upper limit of the resource of the physical server 2. The migration information DB 114 stores therein information related to a migration. Examples of the information related to the migration include migration date and time, a physical server and a virtual machine at the migration source, a physical server at the migration destination, the execution state of the migration, and the like. The configuration information DB 113 is created by the configuration information collecting unit 13, which will be described later. The data structure of each DB will also be described later.

The performance information collecting unit 12 periodically collects, from the hypervisor 21, performance information on the virtual machine that is managed by the hypervisor 21 and records the collected performance information in the performance information DB 111. For example, every five minutes, the performance information collecting unit 12 collects, from the hypervisor 21, the resource usage that is managed by the hypervisor 21 and records the collected resource usage in the performance information DB 111.

Figure 3:
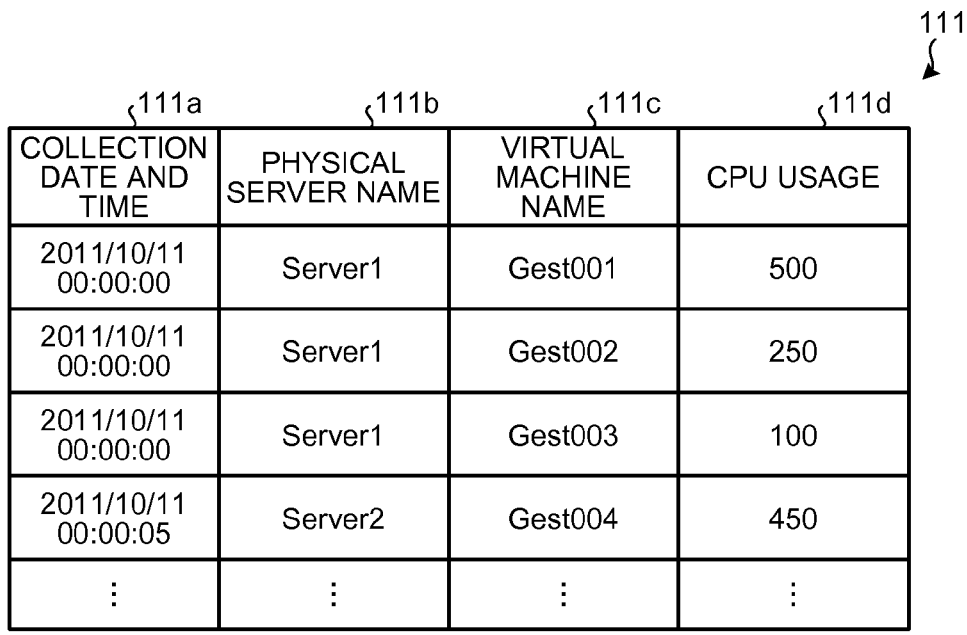
FIG. 3 is a schematic diagram illustrating an example of the data structure of a performance information DB.

In the following, the data structure of the performance information DB 111 will be described with reference to FIG. 3. FIG. 3 is a schematic diagram illustrating an example of the data structure of a performance information DB. As illustrated in FIG. 3, the performance information DB 111 stores therein, in an associated manner, a collection date and time 111a, a physical server name 111b, a virtual machine name 111c, and CPU usage 111d. The collection date and time 111a represent, as performance information, the date and time at which CPU usage is collected. The physical server name 111b represents the name of a physical server. The virtual machine name 111c represents the name of a virtual machine. The CPU usage 111d represents usage of a CPU as performance information. For example, if the collection date and time 111a is "2011/10/11 at 00:00:00", the performance information DB 111 stores therein "Server1" as the physical server name 111b, "Gest001" as the virtual machine name 111c, and "500" as the CPU usage 111d. Specifically, if the collection date and time is "2011/10/11 at 00:00:00", the CPU usage is "500" MHz in the virtual machine "Gest001" in the physical server "Server1".

A description will be given here by referring back to FIG. 2. The configuration information collecting unit 13 periodically collects, from the hypervisor 21, configuration information that is managed by the hypervisor 21 and then records the collected configuration information in the configuration information DB 113. For example, once one hour the configuration information collecting unit 13 collects, from the hypervisor 21, the configuration information managed by the hypervisor 21 and records the collected configuration information in the configuration information DB 113.

Figure 4:
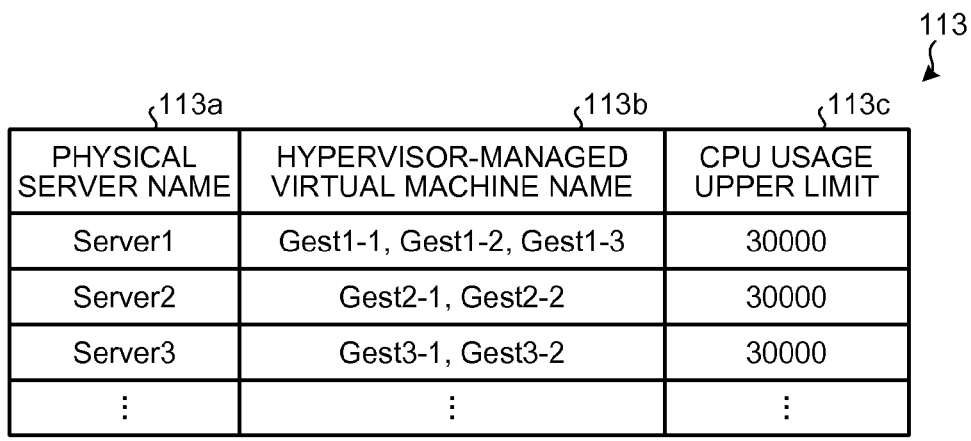
FIG. 4 is a schematic diagram illustrating an example of the data structure of a configuration information DB.

In the following, the data structure of the configuration information DB 113 will be described with reference to FIG. 4. FIG. 4 is a schematic diagram illustrating an example of the data structure of a configuration information DB. As illustrated in FIG. 4, the configuration information DB 113 stores therein, in an associated manner, a physical server name 113a, a hypervisor-managed virtual machine name 113b, and a CPU usage upper limit 113c. The physical server name 113a indicates the name of the physical server. The hypervisor-managed virtual machine name 113b represents the name of a virtual machine managed by the hypervisor 21. The CPU usage upper limit 113c represents the upper limit of the CPU usage of the physical server. For example, if the physical server name 113a is "Server1", the configuration information DB 113 stores therein the hypervisor-managed virtual machine name 113b as "Gest1-1, Gest1-2, Gest1-3" and the CPU usage upper limit 113c as "30000".

A description will be given here by referring back to FIG. 2. The migration control unit 14 includes an internal memory that stores therein control data and programs that is related to the migration control and that prescribe various kinds of procedures, whereby various kinds of processes are executed. Furthermore, the migration control unit 14 corresponds to an integrated circuit, such as an application specific integrated circuit (ASIC), a field-programmable gate array (FPGA), and the like or an electronic circuit, such as a central processing unit (CPU), a micro processing unit (MPU), and the like. Furthermore, the migration control unit 14 includes a main processing unit 141 and the predicted performance information creating unit 142. Furthermore, the migration control unit 14 includes a resource shortage predicting unit 143, a migration source determining unit 144, a migration destination determining unit 145, and a migration execution requesting unit 146.

The main processing unit 141 is a processing unit that mainly performs various processes related to the migration control. For example, the main processing unit 141 periodically schedules a migration. For example, the main processing unit 141 determines, every five minutes, whether it is time to schedule the migration. If the main processing unit 141 determines that it is time to schedule the migration, the main processing unit 141 calls the predicted performance information creating unit 142, which will be described later, in order to create predicted performance information that is used when the migration is scheduled. In contrast, if the main processing unit 141 determines that it is not time to schedule the migration, the main processing unit 141 calls the migration execution requesting unit 146, which will be describe later, in order to request the execution of the scheduled migration.

By using the past resource usage stored in the performance information DB 111, the predicted performance information creating unit 142 performs three types of sampling on resource usage for each virtual machine 22 in the physical server 2. For example, in a first type of sampling, the most recent several days are defined as the sampling target, which is referred to as "most recent sampling". In a second type of sampling, several days corresponding to the same days of the week for which the sampling is performed are defined as the sampling target, which is referred to as "day-of-week sampling". In a third type of sampling, several days corresponding to the same day on which the sampling is performed are defined as the sampling target, which is referred to as "date sampling". Then, for these three types of sampling, the predicted performance information creating unit 142 performs sampling on the resource usage of the sampling target defined by each type. The resource usage subjected to sampling is obtained at multiple time points over a predetermined time period. However, the same number of days for which the sampling is performed and the same predetermined time period are used in these three types of sampling. For example, if the date on which sampling is performed is on Thursday, 11/10 (i.e., month/day) and the number of days for which the sampling is performed is three, the sampling target will be 11/9, 11/8, and 11/7 in the "most recent sampling"; the sampling target will be on Thursdays, 11/3, 10/27, and 10/20 in the "day-of-week sampling"; and the sampling target will be 10/10, 9/10, and 8/10 in the "date sampling".

Furthermore, the predicted performance information creating unit 142 calculates the magnitude of variation in the sampling for each type of sampling. The magnitude of variation is obtained by calculating the absolute difference sum by using the resource usage of each sampling target obtained at the same collection time point and then calculating the total value of the calculated absolute difference sums for the different collection time points. The total value of the calculated absolute difference sums is the magnitude of variation in the sampling type. The absolute difference sum is known to be used to determine the similarity of, for example, an image. If the absolute difference sum is used to determine the image similarity, the absolute difference sum is a value obtained by adding an absolute value of a difference between pixels of two images positioned at the same coordinates. It is assumed that the two images are similar as the value decreases. The predicted performance information creating unit 142 arrays resource usage of each sampling target in time series and uses the arrayed resource usage as the target for the absolute difference sum. Then, by using the total value of the calculated absolute difference sums, the predicted performance information creating unit 142 checks the magnitude of variation of each of the three types of sampling. Then, the predicted performance information creating unit 142 specifies the type of sampling having the smallest magnitude of variation from among the three types of sampling. By using the specified type of sampling, the predicted performance information creating unit 142 creates predicted performance information on the virtual machine 22 and on the physical server 2.

In the following, an example of calculating the variation for each type of sampling will be described with reference to FIGS. 8A to 8C. FIG. 8A is a schematic diagram illustrating an example of calculating the absolute difference sum of the most recent sampling. FIG. 8B is a schematic diagram illustrating an example of calculating the absolute difference sum of day-of-week sampling. FIG. 8C is a schematic diagram illustrating an example of calculating an absolute difference sum of date sampling.

As illustrated in FIG. 8A, it is assumed that 11/7, 11/8, and 11/9 are the sampling targets and assumed that the predetermined time period for the sampling is from 0:00 to 0:15. The predicted performance information creating unit 142 calculates an absolute difference sum by using the resource usage that is obtained at the same collection time as that of the sampling targets 11/7, 11/8, and 11/9. In this example, for a collection time at 0:00, the absolute value of the difference between the CPU usage on 11/7 and 11/8 is 100, the absolute value of the difference between the CPU usage on 11/8 and 11/9 is 50, and the absolute value of the difference between the CPU usage on 11/7 and 11/9 is 150. Consequently, the absolute difference sum of the collection time at 0:00 is 300, which is the sum of the absolute values of all the differences. Similarly, the absolute difference sum of the collection time 0:05 is 600, the absolute difference sum of the collection time at 0:10 is 500, and the absolute difference sum of the collection time at 0:15 is 400.

Then, the predicted performance information creating unit 142 calculates the total value of the absolute difference sums for the different calculated collection times. In this example, the predicted performance information creating unit 142 adds up the absolute difference sums, i.e., (300+600+500+400), where each absolute difference sum is for a different collection time, to obtain the total sum of the absolute difference sums, i.e., 1800. The calculated value corresponds to the magnitude of variation of the most recent sampling.

In FIG. 8B, it is assumed that 10/20, 10/27, and 11/3 are the sampling target. Similarly to the most recent sampling, it is assumed that the predetermined time period for the sampling is from 0:00 to 0:15. The predicted performance information creating unit 142 calculates an absolute difference sum by using the resource usage that is obtained at the same collection time as that of the sampling targets 10/20, 10/27, and 11/3. In this example, for the collection time at 0:00, the absolute value of the difference between the CPU usage on 10/20 and 10/27 is 200, the absolute value of the difference between the CPU usage on 10/27 and 11/3 is 50, and the absolute value of the difference between the CPU usage on 10/20 and 11/3 is 150. Consequently, the absolute difference sum of the collection time at 0:00 is 400, which is the sum of the absolute values of all the differences. Similarly, the absolute difference sum at the collection time 0:05 is 200, the absolute difference sum at the collection time 0:10 is 400, and the absolute difference sum at the collection time 0:15 is 200.

Then, the predicted performance information creating unit 142 calculates the total value of the absolute difference sums for the different calculated collection times. In this example, the predicted performance information creating unit 142 adds up the absolute difference sum, i.e., (400+200+400+200), where each absolute difference sum is for a different collection time, to obtain the total sum of the absolute difference sums, i.e., 1200. The calculated value corresponds to the magnitude of variation of the day-of-week sampling.

It is assumed that 8/10, 9/10, and 10/10 are the sampling target, as illustrated in FIG. 8C. Similarly to the most recent and day-of-week sampling, it is assumed that the predetermined time period for the sampling is from 0:00 to 0:15. The predicted performance information creating unit 142 calculates an absolute difference sum by using the resource usage that is obtained at the same collection time as that of the sampling targets 8/10, 9/10, and 10/10. In this example, for the collection time at 0:00, the absolute value of the difference between the CPU usage on 8/10 and 9/10 is 250, the absolute value of the difference between the CPU usage on 9/10 and 10/10 is 150, and the absolute value of the difference between the CPU usage on 8/10 and 10/10 is 100. Consequently, the absolute difference sum of the collection time at 0:00 is 500, which is the sum of the absolute values of all the differences. Similarly, the absolute difference sum of the collection time at 0:05 is 600, the absolute difference sum of the collection time at 0:10 is 600, and the absolute difference sum of the collection time at 0:15 is 700.

Then, the predicted performance information creating unit 142 calculates the total value of the absolute difference sums for the different calculated collection times. In this example, the predicted performance information creating unit 142 adds up the absolute difference sums, i.e., (500+600+600+700), where each absolute difference sum is for a different collection time, to obtain the total sum of the absolute difference sums, i.e., 2400. The calculated value corresponds to the magnitude of variation of the date sampling.

Furthermore, by using the total value of the absolute difference sums, the predicted performance information creating unit 142 determines the magnitude of variation of the three types of sampling. Then, from among the three types of sampling, the predicted performance information creating unit 142 specifies the sampling having the smallest magnitude of variation. In this example, the total of the absolute difference sums for the most recent sampling is 1800, the total of the absolute difference sums for the day-of-week sampling is 1200, and the total of the absolute difference sums for the date sampling is 2400. Consequently, the predicted performance information creating unit 142 specifies the day-of-week sampling as the type of sampling having the smallest variation.

A description will be given here by referring back to FIG. 2. By using the resource usage of the sampling target of the specified type of sampling, the predicted performance information creating unit 142 calculates, for each virtual machine 22, the average of the resource usages with each resource usage being obtained at a different collection time point. Specifically, the predicted performance information creating unit 142 regards the calculated average of the resource usage as the resource usage that will be used by the associated virtual machine 22 in the future. The average of the resource usage is referred to as "predicted resource usage".

In the following, an example of calculating the "predicted resource usage" will be described with reference to FIG. 9. FIG. 9 is a schematic diagram illustrating an example of calculating predicted resource usage. In FIG. 9, it is assumed that the specified type of sampling is day-of-week sampling. By using the CPU usage of each of the sampling targets 10/27, 11/8, and 11/3 for the specified day-of-week sampling, the predicted performance information creating unit 142 calculates the average of CPU usage in one of the virtual machines 22, where each CPU usage is for a different collection time. In this example, for collection time 0:00, the predicted performance information creating unit 142 calculates the average value "916" of the CPU usage by using, for example, each of the CPU usages, i.e., 800, 1000, and 950. The calculated value corresponds to predicted resource usage at collection time 0:00.

A description will be given here by referring back to FIG. 2. As described above, the predicted performance information creating unit 142 calculates predicted resource usage for each of the virtual machines 22 and records, for each virtual machine 22, the calculated predicted resource usage in the virtual-machine predicted information table 1121. Furthermore, the predicted performance information creating unit 142 calculates the total value of the predicted resource usage of all of the virtual machines 22 in the physical server 2 and records it in the physical-server predicted information table 1122 as the predicted resource usage of the physical server 2.

In the following, the data structure of the virtual-machine predicted information table 1121 will be described with reference to FIG. 5. FIG. 5 is a schematic diagram illustrating an example of the data structure of a virtual-machine predicted information table. As illustrated in FIG. 5, the virtual-machine predicted information table 1121 stores therein, in an associated manner, a future date and time 1121$a$, a physical server name 1121$b$, a virtual machine name 1121$c$, and predicted CPU usage 1121$d$. The future date and time 1121$a$ is the date and time of the predicted time period, which starts from the predicted start date and time and ends at the predicted end date and time. The physical server name 1121$b$ represents the name of a physical server. The virtual machine name 1121$c$ represents the name of a virtual machine. The predicted CPU usage 1121$d$ represents the predicted usage of a CPU. For example, if the future date and time 1121$a$ is "2011/10/12 at 00:00:00", the virtual-machine predicted information table 1121 stores therein "Server1" as the physical server name 1121$b$, "Gest001" as the virtual machine name 1121$c$, and "70" as the predicted CPU usage 1121$d$. Specifically, if the future date and time is "2011/10/12 at 00:00:00", it indicates that the predicted CPU usage is "70" MHz in the virtual machine "Gest001" in the physical server "Server1".

In the following, the data structure of the physical-server predicted information table 1122 will be described with reference to FIG. 6. FIG. 6 is a schematic diagram illustrating an example of the data structure of a physical-server predicted information table. As illustrated in FIG. 6, the physical-server predicted information table 1122 stores therein, in an associated manner, a future date and time 1122$a$, a physical server name 1122$b$, and predicted CPU usage 1122$c$. The future date and time 1122$a$ is the date and time over the predicted time period starting from the predicted start date and time and ending at the predicted end date and time. The physical server name 1122$b$ represents the name of the physical server. The predicted CPU usage 1122$c$ represents predicted usage of a CPU. For example, if the future date and time 1122$a$ is "2011/10/12 at 00:00:00", the physical-server predicted information table 1122 stores therein "Server1" as the physical server name 1122$b$ and "250" as the predicted CPU usage 1122$c$. Specifically, if the future date and time is "2011/10/12 at 00:00:00", the predicted CPU usage is "250" MHz in the physical server "Server1".

A description will be given here by referring back to FIG. 2. The resource shortage predicting unit 143 acquires, for each physical server 2, resource usage from the physical-server predicted information table 1122 and determines whether the acquired resource usage exceeds a threshold. If the resource shortage predicting unit 143 determines that the resource usage exceeds the threshold, the resource shortage predicting unit 143 determines that a resource shortage is predicted and calls the migration source determining unit 144, which will be described later. Here, the threshold is, for example, 80% of the upper limit of the resource usage; however, the threshold is not limited thereto. Any threshold may be used as long as it is a limit value with which a resource shortage is estimated. The upper limit of the resource usage is stored in the CPU usage upper limit 113$c$ that is associated with the physical server 2 in the configuration information DB 113. The resource usage is stored in the predicted CPU usage 1122$c$ that is associated with the future date and time 1122$a$ in the physical-server predicted information table 1122. Namely, the resource shortage predicting unit 143 determines whether data in the predicted CPU usage 1122$c$ exceeds the threshold for the associated data in the future date and time 1122$a$.

The migration source determining unit 144 specifies the virtual machine 22 to be migrated from the physical server 2 for which a resource shortage is predicted and determines a time point at which the migration to be performed on the physical server 2. For example, the migration source determining unit 144 specifies a combination of the virtual machines 22 that can eliminate a resource shortage by moving, at the time point at which the resource shortage occurs in the physical server 2 for which the resource shortage is predicted, the virtual machines 22 mounted on the physical server 2, for which a resource shortage is predicted, to another physical server 2. Hereinafter, this combination is referred to as a "move combination". Furthermore, when a resource shortage occurs in the physical server 2, if the resource usage of one of the virtual machines 22 occupies a certain percentage (for example, 30% or more) of the resource usage of the physical server 2, the migration source determining unit 144 excludes the subject virtual machine 22 from the target move combination. This is because, if migration is performed on the subject virtual machine 22, resource usage at the move destination may possibly run short.

Furthermore, from among the move combinations, the migration source determining unit 144 specifies a move combination involving the smallest number of virtual machines 22. Consequently, the migration source determining unit 144 can minimize the effect of the migration on a task.

Furthermore, if there are multiple specified move combinations, the migration source determining unit 144 uses a move combination that includes the virtual machine 22 that has the earliest time point at which the resource usage thereof is at a minimum before a resource shortage occurs in the physical server 2 for which a resource shortage is predicted. If multiple specified move combinations are present, the migration source determining unit 144 may also use a move combination in which the average of the resource usages is a minimum at the earliest time point.

Furthermore, if a single move combination is specified, the migration source determining unit 144 uses one of the virtual machines 22 included in this move combination as a virtual machine that is to be subjected to migration. Then, for one of the targeted virtual machines 22 included in this move combination, the migration source determining unit 144 records the virtual machines 22 in the migration information DB 114 starting with the virtual machine 22 that has the earliest time point at which the resource usage thereof is at a minimum. Furthermore, the migration source determining unit 144 uses, as virtual machines to be subjected to migration, the virtual machines 22 included in the move combination that was used when the move combinations are multiple. Then, for the virtual machine 22 included in the move combinations, the migration source determining unit 144 records the virtual machines 22 in the migration information DB 114 starting with the virtual machine 22 that has the earliest time point at which the resource usage thereof is at a minimum. Namely, the time point at which resource usage is at a minimum corresponds to the time point at which migration is performed. Furthermore, the migration source determining unit 144 can perform migration earlier as the time point at which resource usage is at a minimum is reached earlier.

In the following, the data structure of the migration information DB 114 will be described with reference to FIG. 7.

FIG. 7 is a schematic diagram illustrating an example of the data structure of a migration information DB. As illustrated in FIG. 7, the migration information DB 114 stores therein, in an associated manner, a migration date and time 114a, a migration source physical server name 114b, a migration source virtual machine name 114c, a migration destination physical server name 114d, and an execution state 114e. The migration date and time 114a represents the date and time when migration is performed. The migration source physical server name 114b represents the name of the physical server of the migration source. The migration source virtual machine name 114c represents the name of the virtual machine of the migration source. The migration destination physical server name 114d represents the name of the physical server at the migration destination. The execution state 114e represents the execution state of the migration. For example, the execution state includes "pre-execution" indicating that migration is before execution, "active" indicating that migration is active, "execution completion" indicating that migration is completed normally, and "non-completion" indicating that the migration is abnormal. For example, if the migration date and time 114a is "2011/10/12 at 5:25:00", the migration information DB 114 stores therein "Server1" as the migration source physical server name 114b; "Gest1-1" as the migration source virtual machine name 114c; "Server5" as the migration destination physical server name 114d; and "execution completion" as the execution state 114e.

The migration destination determining unit 145 determines the physical server 2 at the migration destination. For example, the migration destination determining unit 145 refers to the migration information DB 114 and determines whether there is a record in which the migration source virtual machine name 114c is set and the migration destination physical server name 114d is not set. If the migration destination determining unit 145 determines that a target record is present, the migration destination determining unit 145 determines, for the target record, the physical server 2 at the migration destination with respect to the virtual machine 22 at the migration source.

Determining the physical server 2 at the migration destination is performed, for example, as follows. The migration destination determining unit 145 specifies the physical server 2 at the move destination whose resource usage does not exceed the threshold due to moving the virtual machine 22 at the migration source. The same threshold used for the resource usage in the resource shortage predicting unit 143 is used here. Furthermore, from among the specified physical servers 2, the migration destination determining unit 145 determines, as the physical server 2 at the migration destination, the physical server 2 at the move destination whose resource usage is the closest to the threshold.

The migration destination determining unit 145 acquires, for example, from the virtual-machine predicted information table 1121, the predicted resource usage of the virtual machine 22 at the migration source. Furthermore, the migration destination determining unit 145 acquires, from the physical-server predicted information table 1122, the predicted resource usage for each of the physical servers 2. Then, the migration destination determining unit 145 merges the predicted resource usage of the virtual machine 22 with the predicted resource usage of each of the physical servers 2. At this point, if the name of the physical server 2 to be merged has already been stored in the migration information DB 114 as the physical server at the migration destination, the migration destination determining unit 145 also merges the predicted resource usage of the virtual machine 22 at the move source. Then, from among the predicted resource usages that are merged for each physical server 2, the migration destination determining unit 145 determines whether there is a predicted resource usage exceeding the threshold. If the migration destination determining unit 145 determines that the predicted resource usage exceeding the threshold is present, the migration destination determining unit 145 excludes the physical server 2 corresponding to this predicted resource usage from the migration destination. The reason for this is, if this physical server 2 is used as the migration destination, the resource usage of the physical server 2 may possibly run short. Then, for the physical server 2 whose resource usage does not exceed the threshold, the migration destination determining unit 145 calculates the difference between the predicted resource usage subjected to merging and the threshold. The difference is calculated every time point for a predicted time period (future date and time). Then, the migration destination determining unit 145 calculates the sum of the differences for the different time points for the predicted time period (hereinafter, referred to as a "difference sum"). Namely, the "difference sum" is represented by Equation (1) below:

difference sum=threshold sum−(sum of predicted resource usages of a virtual machine at the migration source+sum of predicted resource usages of a physical server at the migration destination)        Equation (1)

Then, the migration destination determining unit 145 determines the physical server 2 that has the minimum difference sum as the migration destination. The reason for using the physical server 2 having the minimum difference sum as the migration destination is to use the resource with the maximum efficiency even after the migration is performed. Then, for the physical server 2 determined to be used as the migration destination, the migration destination determining unit 145 records the name thereof and the execution state ("pre-execution") in the migration information DB 114.

If the predicted resource usage of all of the physical servers 2 exceeds the threshold, the migration destination determining unit 145 increases the threshold and re-performs the above process.

The migration execution requesting unit 146 requests a migration to be executed at regular intervals. For example, the migration execution requesting unit 146 refers to the migration information DB 114 and determines whether, for each record, migration is needed. For example, if the migration date and time 114a have elapsed and if the execution state 114e is "pre-execution", the migration execution requesting unit 146 determines that migration is needed. If the migration execution requesting unit 146 determines that the migration is needed, the migration execution requesting unit 146 requests the execution of the migration from the hypervisor 21 in the virtual machine 22 at the migration source and the hypervisor 21 in the physical server 2 at the migration destination. Then, the migration execution requesting unit 146 updates the execution state of the migration to the execution state 114e in the migration information DB 114.

Description of a process for creating predicted performance information

In the following, the flow of creating predicted performance information in the predicted performance information creating unit 142 will be described with reference to FIG. 10. FIG. 10 is a schematic diagram illustrating the flow of creating predicted performance information in a predicted performance information creating unit. As illustrated in FIG. 10, the predicted performance information creating unit 142 performs three types of sampling for each of the virtual machines 22 in the physical server 2 by using the past resource usage stored in the performance information DB 111. Here, the predicted performance information creating unit 142 performs the "most recent sampling", the "day-of-week sampling", and the "date sampling". Specifically, for the sampling target specified for each type of sampling, the predicted performance information creating unit 142 performs the sampling on the resource usage.

Then, by using the resource usage that has been subjected to the sampling, the predicted performance information creating unit 142 takes the absolute difference sum for each type of sampling and calculates the total value of these absolute difference sums. Then, by using the total value of the absolute difference sums, the predicted performance information creating unit 142 determines the magnitude of variation of the three types of sampling and specifies the type of sampling having the smallest variation from among the three types of sampling. In this case, the magnitude of variation of the "most recent sampling", the "day-of-week sampling", and the "date sampling" are 250, 350, and 100, respectively. Consequently, the predicted performance information creating unit 142 specifies the "date sampling" as the type of sampling having the smallest magnitude of variation.

Then, by using the resource usage of the sampling target of the specified "date sampling", the predicted performance information creating unit 142 calculates the average value of the resource usage at each collection time point. The predicted performance information creating unit 142 records, as the predicted resource usage of the corresponding virtual machine 22, the average value calculated at each collection time point in the virtual-machine predicted information table 1121 in the predicted performance information DB 112. Furthermore, the predicted performance information creating unit 142 calculates the total value of the predicted resource usage of all of the virtual machines 22 in the physical server 2 and records the total value as the predicted resource usage of the physical server 2 in the physical-server predicted information table 1122 in the predicted performance information DB 112.

Description of a Migration Source Determination Process

In the following, determination of the migration source performed by the migration source determining unit 144 will be described with reference to FIG. 11. FIG. 11 is a schematic diagram illustrating the determination of a migration source performed by a migration source determining unit. In FIG. 11, predicted resource usage is associated with a time point in a predicted time period for the physical server 2 for which a resource shortage is predicted by the resource shortage predicting unit 143. Furthermore, the predicted resource usage is associated with each of the virtual machines (Gest1-1, Gest1-2, and Gest1-3) in the physical server 2 for which a resource shortage is predicted.

In FIG. 11, the X-axis represents time and the Y-axis represents predicted resource usage. Furthermore, $t_0$ represents the predicted start time for the predicted time period and $t_9$ represents the predicted end time for the predicted time period. In FIG. 11, the predicted resource usage of the physical server 2 exceeds the threshold at the time point $t_4$. Namely, the time point of $t_4$ corresponds to the time point of the resource shortage.

In this state, the migration source determining unit 144 specifies a move combination of the virtual machines 22 that can eliminate the resource shortage by moving, at the time point $t_4$ at which the resource shortage occurs in the physical server 2 for which the resource shortage is predicted, the virtual machine 22 to another physical server 2. However, if the predicted resource usage of one of the virtual machines 22 occupies a certain percentage of the predicted resource usage of the physical server 2 at the time point $t_4$ (peak time) at which the resource shortage occurs in the physical server 2, the migration source determining unit 144 excludes the subject virtual machine 22 from the move combination. In this example, the Gest1-1 is excluded because the predicted resource usage $r_{41}$ at the peak time occupies a certain percentage of the predicted resource usage of the physical server 2. Furthermore, because the predicted resource usages $r_{42}$ and $r_{43}$ of Gest1-2 and Gest1-3, respectively, at the peak time is greater than a shortage of the resource usage $r_{40}$ of the physical server 2, the Gest1-2 and the Gest1-3 are specified as the move combination. Consequently, the migration source determining unit 144 specifies a combination of {Gest1-2}, {Gest1-3}, and {Gest1-2, Gest1-3} as the move combination.

Then, from among the move combinations, the migration source determining unit 144 specifies a move combination in which the number of virtual machines 22 included in the move combination is the minimum. In this example, the migration source determining unit 144 specifies {Gest1-2} and {Gest1-3}, each of which has a single virtual machine 22.

Then, because multiple move combinations are specified, the migration source determining unit 144 uses the move combination that includes the virtual machine 22 that has the earliest time point at which the predicted resource usage thereof is at a minimum before the time point $t_4$ at which the resource shortage occurs in the physical server 2. In this example, the time point at which the predicted resource usage of the Gest1-2 becomes the minimum ($r_2$) is $t_2$ and the time point at which the predicted resource usage of the Gest1-3 becomes the minimum ($r_1$) is $t_1$. Consequently, the migration source determining unit 144 uses the {Gest1-3} as the move combination having the earliest time point at which the predicted resource usage is at a minimum. Specifically, the migration source determining unit 144 determines that the virtual machine represented by Gest1-3 is the virtual machine at the migration source. The time point $t_1$ corresponds to the time when migration is performed on the virtual machine represented by Gest1-3.

Figure 12:
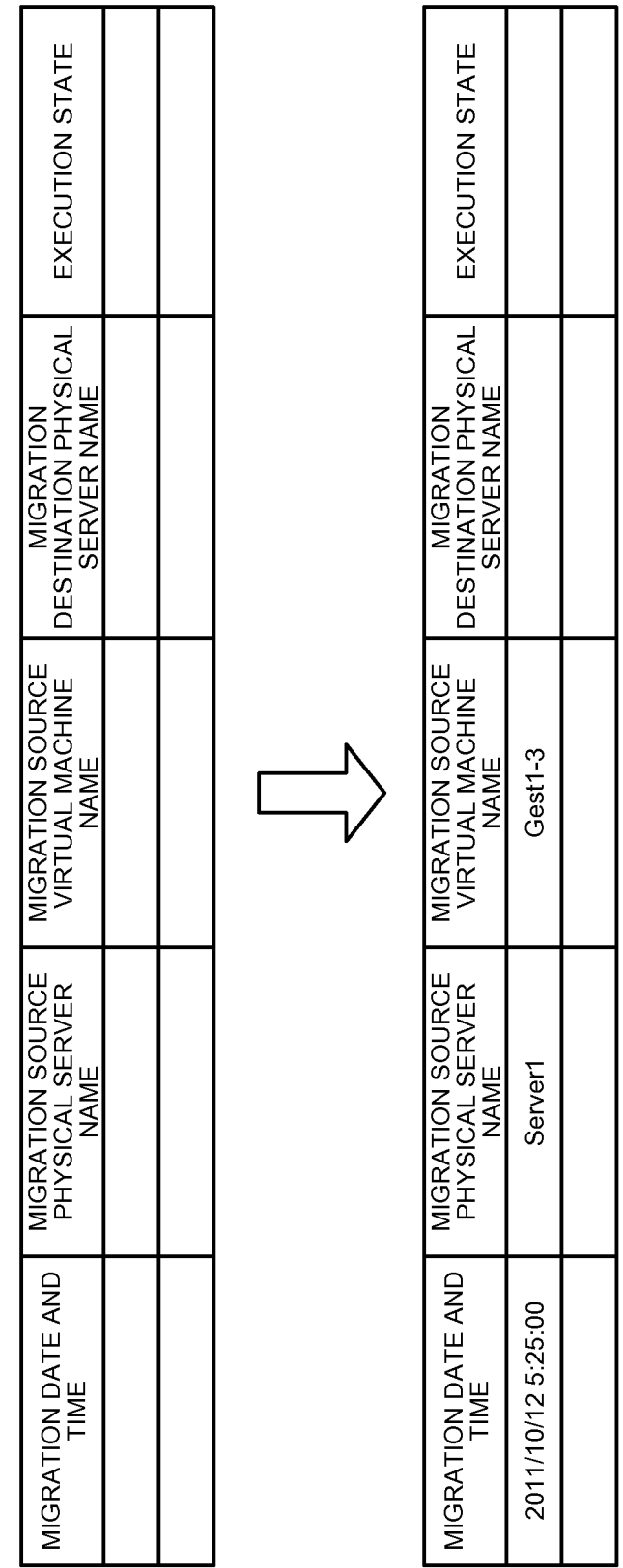
FIG. 12 is a schematic diagram illustrating an example of addition to the migration information DB performed by the migration source determining unit.

In the following, an example of addition to the migration information DB 114 performed by the migration source determining unit 144 will be described with reference to FIG. 12. FIG. 12 is a schematic diagram illustrating an example of addition to the migration information DB performed by the migration source determining unit. As illustrated in FIG. 12, for the virtual machines 22 that is included in the move combination and that is used as the migration source, the migration source determining unit 144 records, in the migration information DB 114, the virtual machines 22 starting with the virtual machine 22 that has the earliest time point at which predicted resource usage is a minimum. In this example, if the virtual machine 22 included in the move combination is only the Gest1-3, the migration source determining unit 144 records, as the migration date and time, "2011/10/12 at 5:25:00", which corresponds to the time point at which the predicted resource usage of the Gest1-3 is at a minimum. Furthermore, the migration source determining unit 144 records "Server1", which is the name of the physical server that has the Gest1-3, as the migration source physical server name and records the "Gest1-3" as the migration source virtual machine name.

Description of the Migration Destination Determination Process

In the following, an example of searching the migration information DB 114 performed by the migration destination determining unit 145 will be described with reference to FIG. 13. FIG. 13 is a schematic diagram illustrating an example of searching the migration information DB performed by the migration destination determining unit. As illustrated in FIG. 13, the migration destination determining unit 145 refers to the migration information DB 114 and determines whether there is a record in which the migration source virtual machine name 114c is set and the migration destination physical server name 114d is not set. If the migration destination determining unit 145 determines that the target record is present, the migration destination determining unit 145 determines, for the target record, the physical server 2 at the migration destination with respect to the virtual machine 22 at the migration source. In this example, because the migration destination physical server names are not set in the records associated with the migration source virtual machine names "Gest3-1" and "Gest4-2", the migration destination determining unit 145 determines that target records are present. Then, the migration destination determining unit 145 determines, for the target records, the physical servers 2 at the migration destination with respect to the migration source virtual machine names "Gest3-1" and "Gest4-2", respectively.

Figure 14:
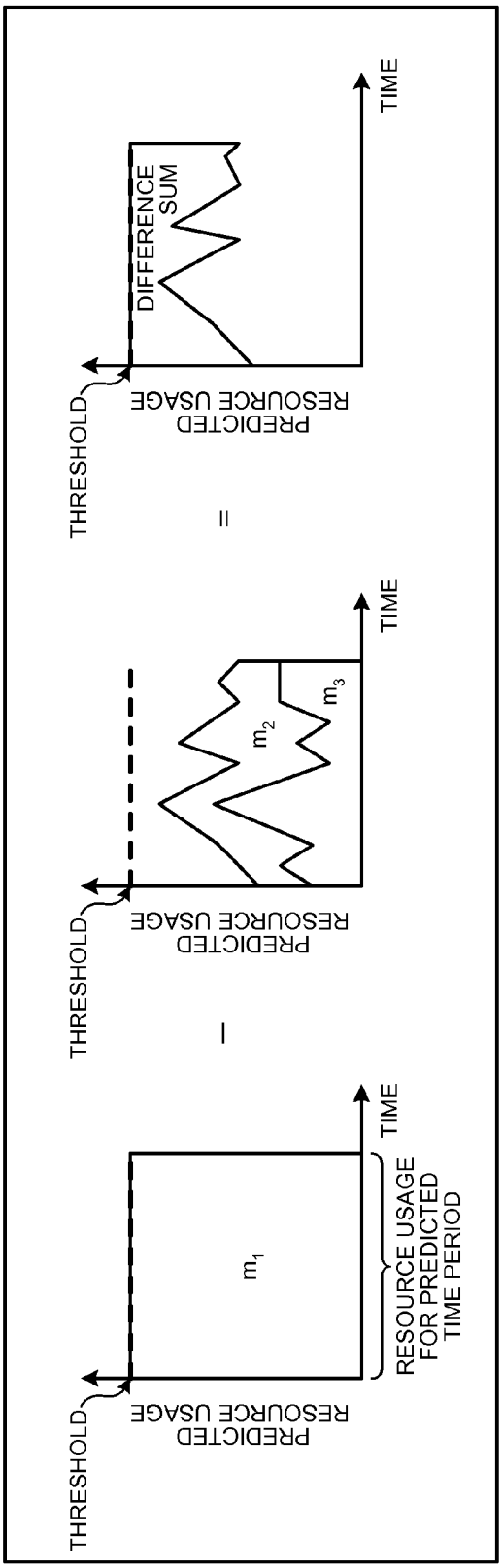
FIG. 14 is a schematic diagram illustrating a difference sum calculated by the migration destination determining unit.

In the following, a difference sum calculated by the migration destination determining unit 145 will be described with reference to FIG. 14. FIG. 14 is a schematic diagram illustrating a difference sum calculated by the migration destination determining unit. In each graph in FIG. 14, the X-axis represents time and the Y-axis represents predicted resource usage. The symbol $m_1$ represents the sum of the thresholds of the resource usage for a predicted time period. The symbol $m_2$ represents the sum of the predicted resource usage of the virtual machine 22 at the migration source for a predicted time period. The symbol $m_3$ represents the sum of the predicted resource usage of the physical server 2 at the migration destination for a predicted time period. In such a case, the migration destination determining unit 145 calculates the difference sum by subtracting ($m_2+m_3$) from $m_1$. Then, the migration destination determining unit 145 determines the physical server 2 that has the minimum difference sum as the physical server at the migration destination. The reason for this is the physical server 2 having the minimum difference sum can efficiently use the resource.

Figure 15:
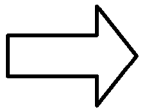
FIG. 15 is a schematic diagram illustrating an example of addition to the migration information DB performed by the migration destination determining unit.

In the following, an example of addition to the migration information DB 114 performed by the migration destination determining unit 145 will be described with reference to FIG. 15. FIG. 15 is a schematic diagram illustrating an example of addition to the migration information DB performed by the migration destination determining unit. In FIG. 15, a description is given of a case in which the migration destination determining unit 145 determines that the physical server 2 at the migration destination, which is associated with the migration source virtual machine name "Gest3-1", is "Server6". As illustrated in FIG. 15, in the migration information DB 114, the migration destination determining unit 145 records the "Server6" in the migration destination physical server name 114d that is associated with the virtual machine name "Gest3-1" at the migration source. Furthermore, in the migration information DB 114, the migration destination determining unit 145 records "pre-execution" in the migration execution state 114e that is associated with the virtual machine name "Gest3-1" at the migration source.

Description of the Migration Execution Requesting Process

In the following, an example of searching the migration information DB 114 performed by the migration execution requesting unit 146 will be described with reference to FIG. 16. FIG. 16 is a schematic diagram illustrating an example of searching the migration information DB performed by a migration execution requesting unit. As illustrated in FIG. 16, the migration execution requesting unit 146 refers to the migration information DB 114 and determines, for each record, whether migration is needed. In this example, the execution state 114e of a record n1 having the migration destination physical server name 114d of "Server7" is "pre-execution". Consequently, if the current time has already passed the migration date and time 114a of "2011/10/12 at 7:28:00", the migration execution requesting unit 146 determines that a migration is needed.

Figure 17:
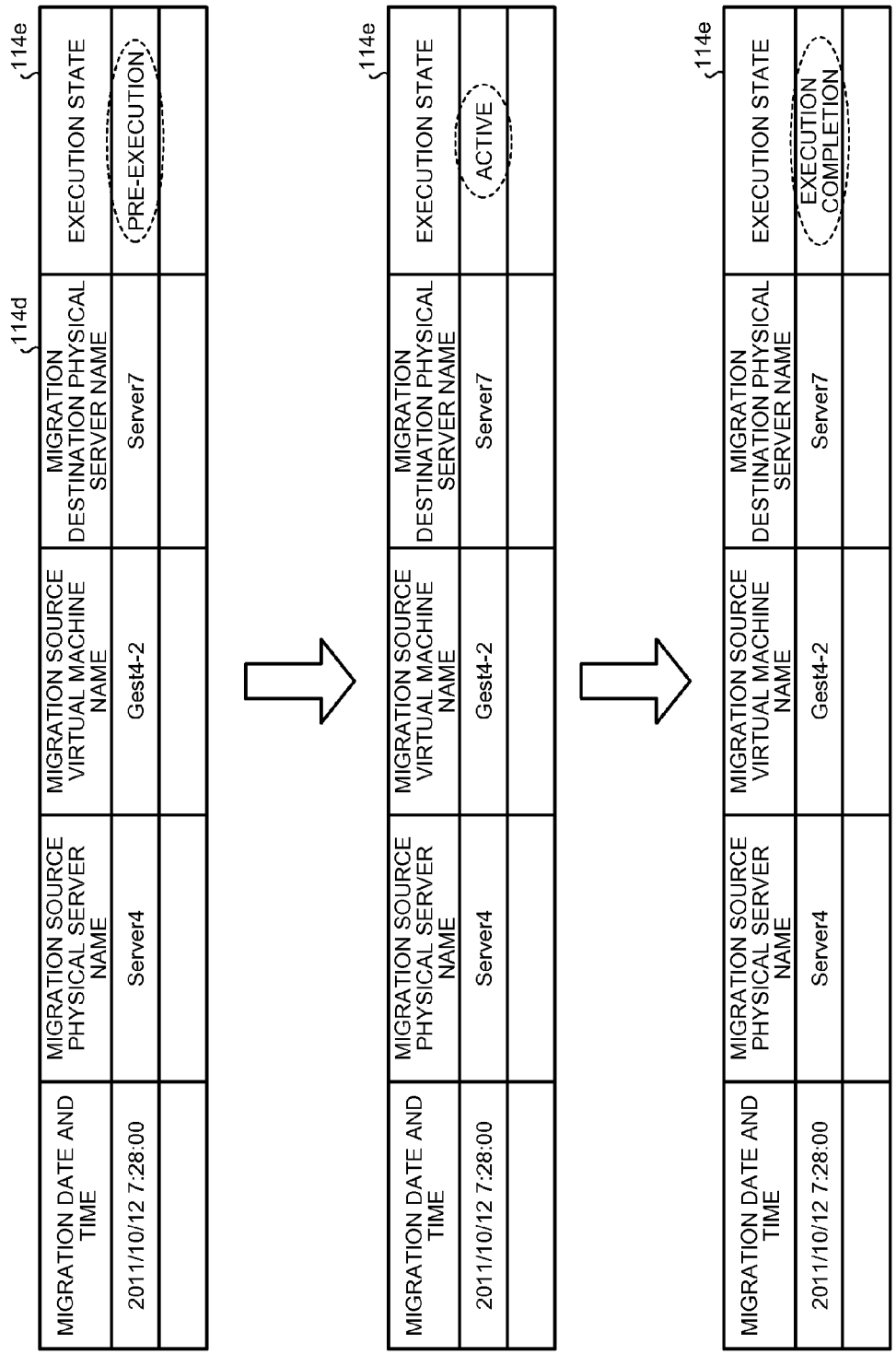
FIG. 17 is a schematic diagram illustrating a shift of the execution state of the migration information DB performed by the migration execution requesting unit.

In the following, a shift of the execution state of the migration information DB 114 performed by the migration execution requesting unit 146 will be described with reference to FIG. 17. FIG. 17 is a schematic diagram illustrating a shift of the execution state of the migration information DB performed by the migration execution requesting unit. As illustrated in the upper portion of FIG. 17, "pre-execution" is set in a record in the execution state 114e that is associated with the migration destination physical server name 114d of "Server7".

For this record, if the migration execution requesting unit 146 determines that a migration is needed, the migration execution requesting unit 146 updates the execution state 114e to "active", as illustrated in the middle portion of FIG. 17. Then, the migration execution requesting unit 146 requests the execution of migration from the hypervisor 21 for the virtual machines 22 at the migration source and requests the execution of migration from the hypervisor 21 in the physical server 2 at the migration destination. If the result of the execution request indicates that the migration is successful, the migration execution requesting unit 146 updates the execution state 114e to "execution completion", as illustrated in the lower portion of FIG. 17. If the result of the execution request indicates that the migration is not successful, the migration execution requesting unit 146 updates the execution state 114e to "not-yet completed".

Figure 18:
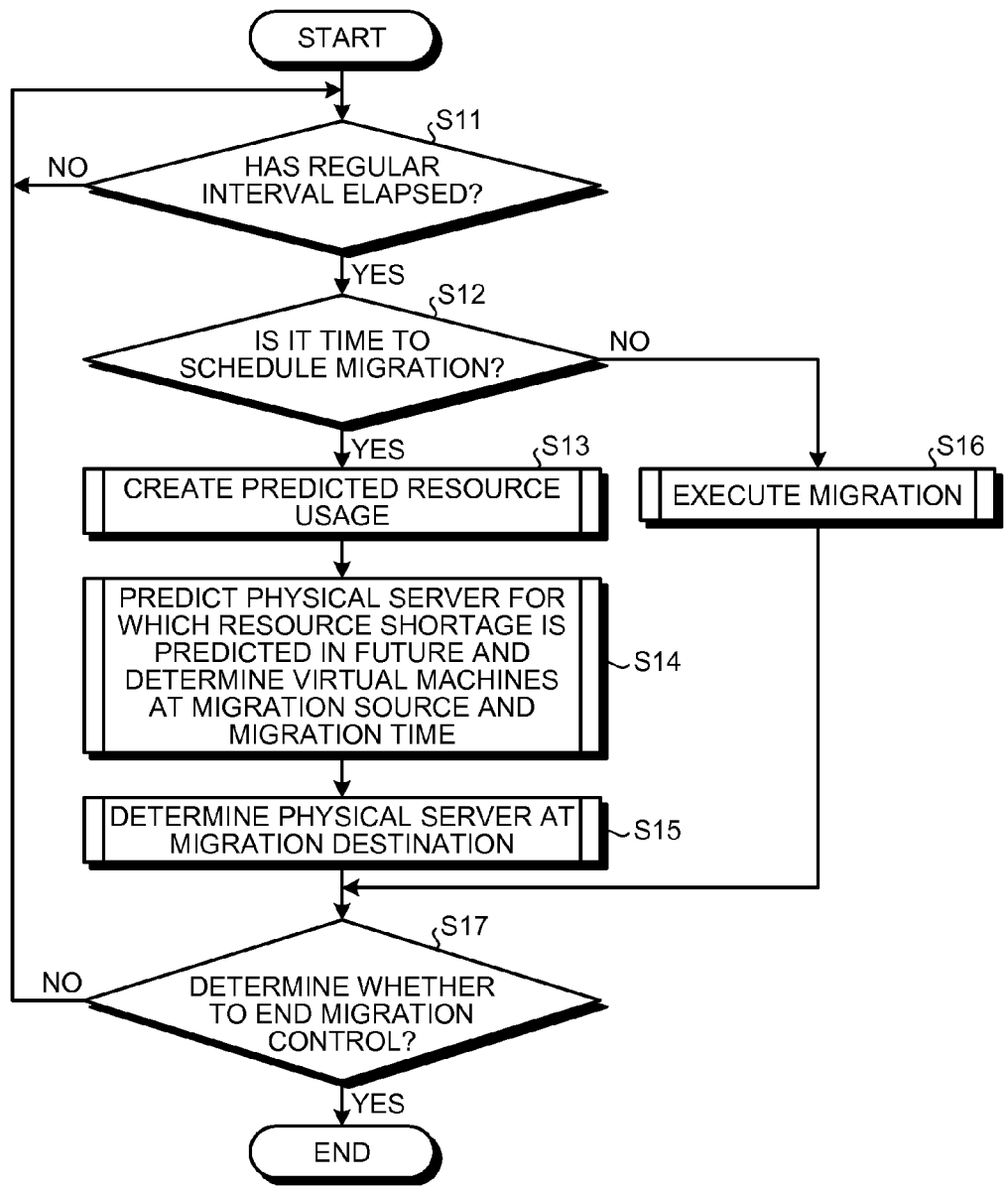
FIG. 18 is a flowchart illustrating the flow of a main process performed by a migration control unit according to the embodiment.

Flow of the main process performed by the migration control unit In the following, the flow of a migration control process performed by the migration control unit 14 will be described with reference to FIGS. 18 to 25. FIG. 18 is a flowchart illustrating the flow of a main process performed by a migration control unit according to the embodiment.

First, the main processing unit 141 determines whether a regular interval (for example, five minutes) has elapsed (Step S11). If it is determined that a regular interval has not elapsed (No at Step S11), the main processing unit 141 repeats the determining process until the regular interval has elapsed. In contrast, if it is determined that the regular interval has elapsed (Yes at Step S11), the main processing unit 141 determines whether the current time is the time (for example, 0:00) to schedule a migration (Step S12).

If it is determined that that the current time is the time to schedule a migration (Yes at Step S12), the main processing unit 141 creates the predicted resource usages of the virtual machine 22 and the physical server 2 (Step S13). The main processing unit 141 calls a predicted performance information creating process in the predicted performance information creating unit 142.

Subsequently, the main processing unit 141 predicts the physical server 2 for which a resource shortage is predicted in the future and determines, for the predicted physical server 2, the virtual machines 22 at the migration source and the migration time (Step S14). The main processing unit 141 calls the resource shortage prediction process in the resource shortage predicting unit 143.

Then, the main processing unit 141 determines the physical server 2 at the migration destination to which the determined virtual machines 22 at the migration source are to be migrated (Step S15). The main processing unit 141 calls the migration destination determination process in the migration destination determining unit 145. Then, the main processing unit 141 proceeds to Step S17.

At Step S12, if it is determined that that the current time is not the time to schedule a migration (No at Step S12), the main processing unit 141 executes the migration (Step S16). Then, the main processing unit 141 calls the migration execution requesting process in the migration execution requesting unit 146 and proceeds to Step S17.

Then, the main processing unit 141 determines whether to end the migration control (Step S17). If it is determined not to end the migration control (No at Step S17), the main processing unit 141 proceeds to Step S11. In contrast, if it is determined to end the migration control (Yes at Step S17), the main processing unit 141 ends the main process.

Figure 19:
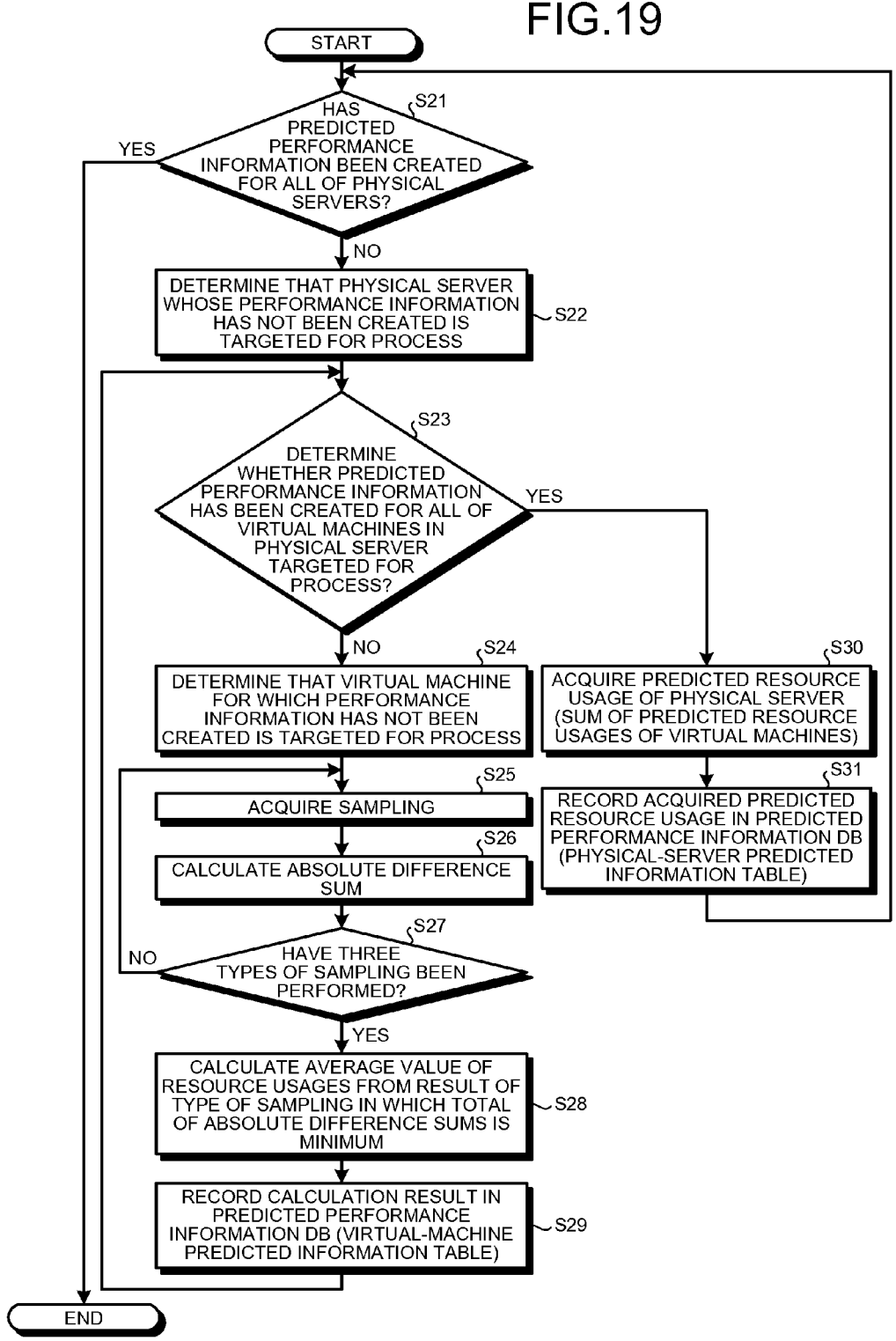
FIG. 19 is a flowchart illustrating the flow of a creation process of the predicted performance information according to the embodiment.

Flow of the predicted performance information creating process performed by the migration control unit FIG. 19 is a flowchart illustrating the flow of a creation process of the predicted performance information according to the embodiment.

The predicted performance information creating unit 142 called by the main processing unit 141 determines whether predicted performance information has been created for all of the physical servers 2 (Step S21). If it is determined that predicted performance information has not been created for all of the physical server 2 (No at Step S21), the predicted performance information creating unit 142 determines that the physical server 2 whose performance information has not been created is targeted for the process (Step S22).

Then, the predicted performance information creating unit 142 determines whether the predicted performance information has been created for all of the virtual machines 22 in the physical server 2 targeted for the process (Step S23). If it is determined that the predicted performance information has not been created for all of the virtual machines 22 in the physical server 2 targeted for the process (No at Step S23), the predicted performance information creating unit 142 determines that the virtual machine 22 for which performance information has not been created is targeted for the process (Step S24).

Subsequently, for resource usage, the predicted performance information creating unit 142 acquires a single type of sampling (Step S25). For example, by using the CPU usage 111d stored in the performance information DB 111, the predicted performance information creating unit 142 performs the sampling on the CPU usage of the virtual machine 22 targeted for the process. One type of sampling is acquired one at a time from among the three types of sampling: "most recent sampling", "day-of-week sampling", and "date sampling".

Then, by using the acquired sampling, the predicted performance information creating unit 142 calculates an absolute difference sum (Step S26). For example, by using the CPU usage that is obtained at the same collection time point as that of the sampling target, which is defined by each type of sampling, the predicted performance information creating unit 142 calculates the absolute difference sums.

Then, the predicted performance information creating unit 142 determines whether the three types of sampling have been performed (Step S27). If it is determined that the three types of sampling have not been performed (No at Step S27), the predicted performance information creating unit 142 proceeds to Step S25 in order to perform the next type of sampling.

In contrast, if it is determined that the three types of sampling has been completed (Yes at Step S27), the predicted performance information creating unit 142 calculates the average value of the resource usages from the result of the type of sampling in which the total of the absolute difference sums is the minimum (Step S28). For example, the predicted performance information creating unit 142 specifies the type of sampling in which the total absolute difference sum is the minimum. Then, by using the resource usage of each sampling target obtained from the specified type of sampling, the predicted performance information creating unit 142 calculates the average value of the resource usages at each of the collection time points. The resource usage corresponds to the CPU usage 111d in the performance information DB 111.

Then, the predicted performance information creating unit 142 records the calculation result in the virtual-machine predicted information table 1121 in the predicted performance information DB 112 (Step S29). The predicted performance information creating unit 142 proceeds to Step S23 in order to perform a process on the virtual machine 22 for which the predicted performance information has not been created.

At Step S23, if it is determined that the predicted performance information has been created for all of the virtual machines 22 in the physical server 2 targeted for the process (Yes at Step S23), the predicted performance information creating unit 142 acquires the predicted resource usage of the physical server 2 targeted for the process (Step S30). By adding up the predicted resource usages of all of the virtual machines 22 in the physical server 2 targeted for the process, the predicted performance information creating unit 142 acquires the predicted resource usage of the targeted physical server 2.

Then, the predicted performance information creating unit 142 records the acquired predicted resource usage in the physical-server predicted information table 1122 in the predicted performance information DB 112 (Step S31). Then, the predicted performance information creating unit 142 proceeds to Step S21 in order to process the physical server 2 for which the predicted performance information has not been created.

At Step S21, if it is determined that the predicted performance information has been created for all of the physical servers 2 (Yes at Step S21), the predicted performance information creating unit 142 ends the predicted performance information creating process.

Figure 20:
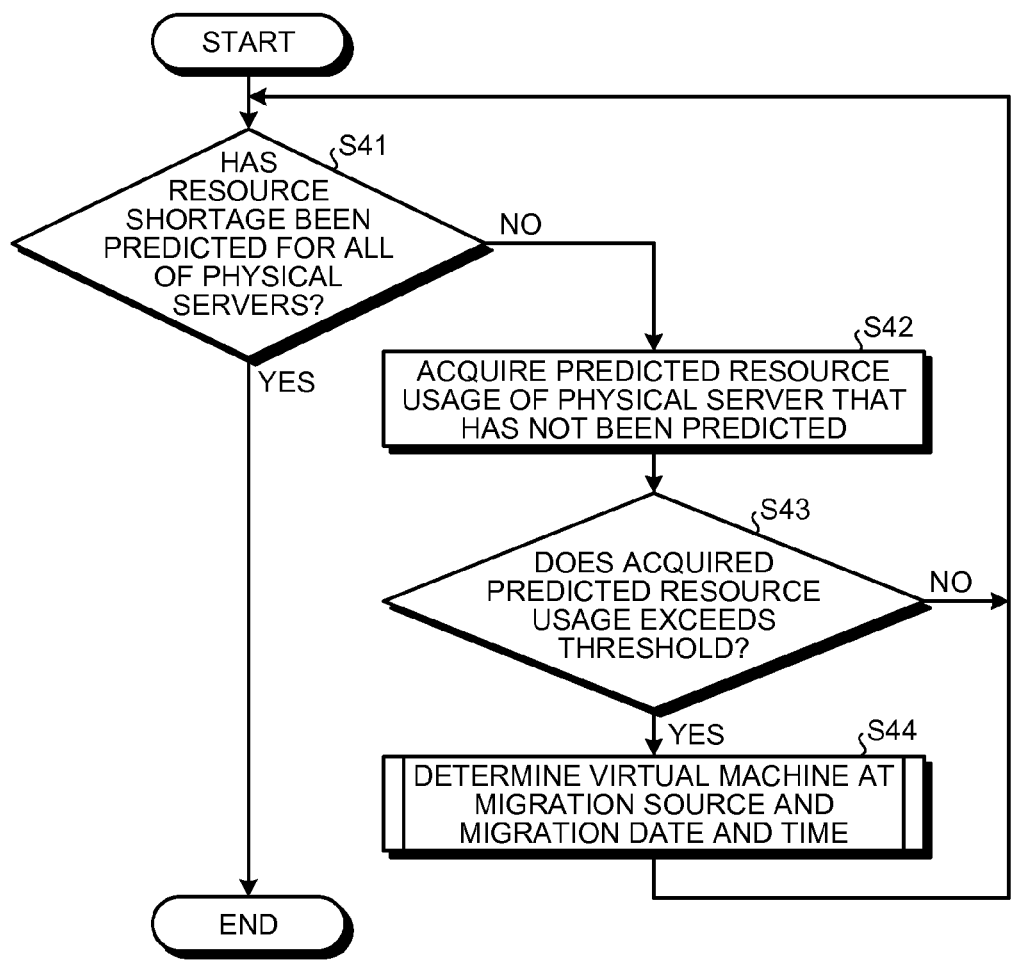
FIG. 20 is a flowchart illustrating the flow of a resource shortage prediction process according to the embodiment.

Flow of the resource shortage prediction process performed by the migration control unit FIG. 20 is a flowchart illustrating the flow of a resource shortage prediction process according to the embodiment.

The resource shortage predicting unit 143 called by the main processing unit 141 determines whether a resource shortage has been predicted for all of the physical servers 2 (Step S41). If it is determined that a resource shortage has not been predicted for all of the physical servers 2 (No at Step S41), the resource shortage predicting unit 143 selects the physical server 2 for which a resource shortage thereof has not been predicted. Then, the resource shortage predicting unit 143 acquires the predicted resource usage of the selected physical server 2 from the physical-server predicted information table 1122 (Step S42). The predicted resource usage corresponds to the predicted CPU usage 1121d for each future date and time 1121a.

Subsequently, the resource shortage predicting unit 143 determines whether the acquired predicted resource usage exceeds the threshold (Step S43). If it is determined that the acquired predicted resource usage exceeds the threshold (Yes at Step S43), the resource shortage predicting unit 143 determines the virtual machine 22 at the migration source in the selected physical server 2 and the migration date and time (Step S44). Consequently, the resource shortage of the selected physical server 2 is predicted. The resource shortage predicting unit 143 calls the migration source determination process in the migration source determining unit 144. Then, the resource shortage predicting unit 143 proceeds to Step S41 in order to select the physical server 2 for which the resource usage has not been predicted.

In contrast, if it is determined that the acquired predicted resource usage does not exceed the threshold (No at Step S43), the resource shortage predicting unit 143 proceeds to Step S41 in order to select the physical server 2 for which the resource usage has not been predicted. At Step S41, if it is determined that the resource shortage of all of the physical servers 2 has been predicted (Yes at Step S41), the resource shortage predicting unit 143 ends the resource shortage prediction process.

Figure 21:
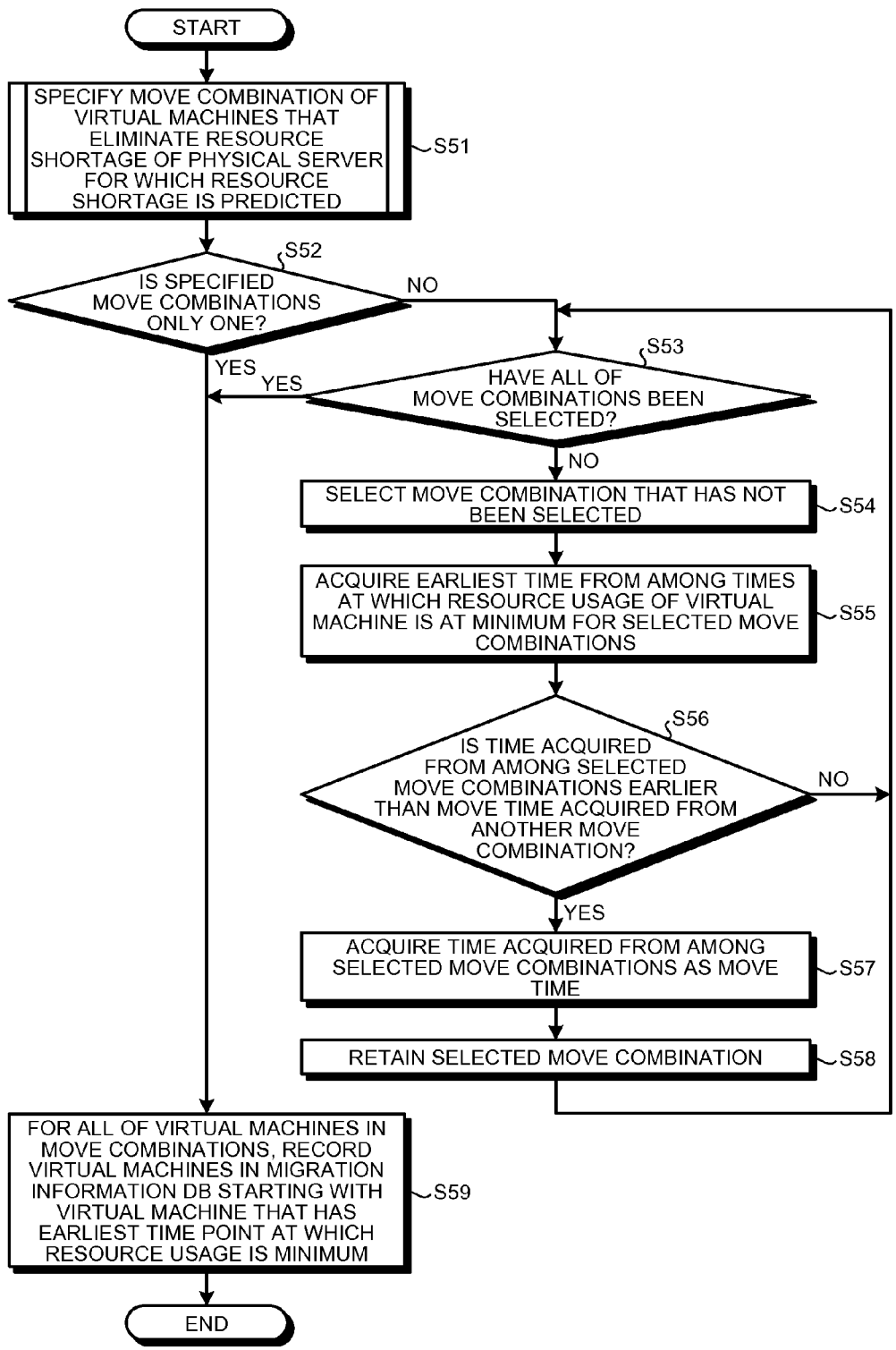
FIG. 21 is a flowchart illustrating the flow of a migration source determination process according to the embodiment.

Flow of the migration source determination process performed by the migration control unit FIG. 21 is a flowchart illustrating the flow of a migration source determination process according to the embodiment.

The migration source determining unit 144 called by the resource shortage predicting unit 143 specifies a move combination of the virtual machines 22 that eliminates the resource shortage of the physical server 2 for which the resource shortage is predicted (Step S51). Then, the migration source determining unit 144 determines whether the number of the specified move combinations is one (Step S52). If it is determined that the number of the specified move combination is one (Yes at Step S52), the migration source determining unit 144 proceeds to Step S59.

In contrast, if it is determined that the number of the specified move combinations is not one (No at Step S52), the migration source determining unit 144 determines whether all of the move combinations have been selected (Step S53). If it is determined that not all of the move combinations have been selected (No at Step S53), the migration source determining unit 144 selects a move combination that has not been selected (Step S54).

Then, for the selected move combinations, the migration source determining unit 144 acquires the earliest time from among the times at which the resource usage of the virtual machine 22 is at a minimum (Step S55). Then, the migration source determining unit 144 determines whether the time acquired from among the selected move combinations is earlier than the move time acquired from another move combination (Step S56). If it is determined that the time acquired from among the selected move combinations is later than the move time acquired from another move combination (No at Step S56), the migration source determining unit 144 proceeds to Step S53 in order to select a move combination that has not been selected.

In contrast, if it is determined that the time acquired from among the selected move combinations is earlier than the move time acquired from another move combination (Yes at Step S56), the migration source determining unit 144 acquires the time acquired from among the selected move combinations as the move time (Step S57). Then, the migration source determining unit 144 retains the selected move combination (Step S58) and proceeds to Step S53 in order to select a move combination that has not been selected.

At Step S53, if it is determined that all of the move combinations have been selected (Yes at Step S53), the migration source determining unit 144 proceeds to Step S59. At Step S59, for all of the virtual machines 22 in the move combinations, the migration source determining unit 144 records the virtual machines 22 in the migration information DB 114 starting with the virtual machine 22 that has the earliest time point at which resource usage is a minimum (Step S59). Then, the migration source determining unit 144 ends the migration source determination process.

Flow of a Process for Specifying a Move Combination of the Virtual Machines

Figure 22:
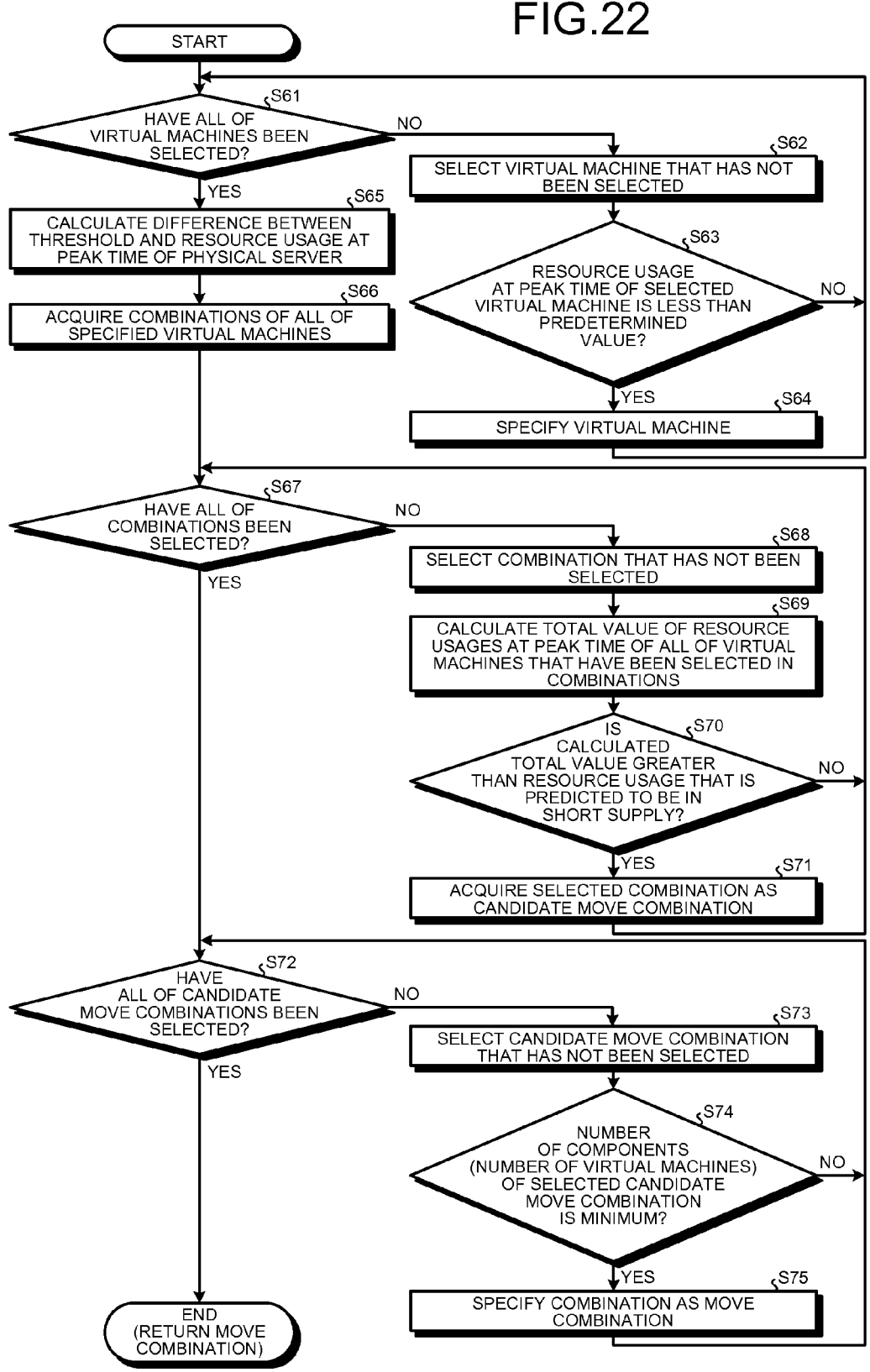
FIG. 22 is a flowchart illustrating the flow of a process for specifying a move combination of a virtual machine.

In the following, the process performed at S51 illustrated in FIG. 21 will be described with reference to FIG. 22. FIG. 22 is a flowchart illustrating the flow of a process for specifying a move combination of a virtual machine.

The migration source determining unit 144 determines whether all of the virtual machines 22 in the physical server 2 for which a resource shortage is predicted have been selected (Step S61). If it is determined that not all of the virtual machines 22 in the physical server 2 for which the resource shortage is predicted have been selected (No at Step S61), the migration source determining unit 144 selects the virtual machine 22 that has not been selected (Step S62).

Then, the migration source determining unit 144 determines whether the resource usage at the peak time of the selected virtual machine 22 is less than a predetermined value (Step S63). The predetermined value is a value corresponding to a certain percentage (for example, 30%) of the upper limit of the resource usage of the physical server 2 for which the resource shortage is predicted. If it is determined that the resource usage at the peak time of the selected virtual machine 22 is greater than a predetermined value (No at Step S63), the migration source determining unit 144 excludes the selected virtual machine 22. Then, the migration source determining unit 144 proceeds to Step S61 in order to select the virtual machine 22 that has not been selected.

In contrast, if it is determined that the resource usage at the peak time of the selected virtual machine 22 is less than a predetermined value (Yes at Step S63), the migration source determining unit 144 specifies the selected virtual machine 22 (Step S64). Then, the migration source determining unit 144 proceeds to Step S61 in order to select one of the virtual machines 22 that has not been selected.

At Step S61, if it is determined that all of the virtual machines 22 in the physical server 2 for which a resource shortage is predicted have been selected (Yes at Step S61), the migration source determining unit 144 calculates the resource usage of the physical server 2 that is predicted to be in short supply (Step S65). Namely, the migration source determining unit 144 calculates the difference between the threshold and the resource usage at the peak time of the physical server 2 for which the resource shortage is predicted. Then, the migration source determining unit 144 acquires the combinations of all of the specified virtual machines 22 (all combinations) (Step S66).

Subsequently, the migration source determining unit 144 determines whether all of the combinations have been selected (Step S67). If it is determined that not all of the combinations are selected (No at Step S67), the migration source determining unit 144 selects the combination that has not been selected (Step S68). Then, the migration source determining unit 144 calculates the total value of the resource usages at the peak time of all of the virtual machines 22 that have been selected in the combinations (Step S69).

Then, the migration source determining unit 144 determines whether the calculated total value is greater than the resource usage that is predicted to be in short supply (Step S70). If it is determined that the calculated total value is greater than the resource usage that is predicted to be in short supply (Yes at Step S70), the migration source determining unit 144 acquires the selected combination as a candidate move combination (Step S71). The reason for this is that the migration source determining unit 144 determined that the resource shortage can be eliminated of the physical server 2 for which the resource shortage is predicted. Then, the migration source determining unit 144 proceeds to Step S67 in order to select a combination that has not been selected.

In contrast, if it is determined that the calculated total value is not greater than the resource usage that is predicted to be in short supply (No at Step S70), the migration source determining unit 144 proceeds to Step S67 in order to select a combination that has not been selected. The reason for this is that the migration source determining unit 144 determines the resource shortage is not eliminated of the physical server 2 for which the resource shortage is predicted.

At Step S67, if it is determined that all of the combinations have been selected (Yes at Step S67), the migration source determining unit 144 determines whether all of the candidate move combinations have been selected (Step S72). If it is determined that not all of the candidate move combinations have been selected (No at Step S72), the migration source determining unit 144 selects a candidate move combination that has not been selected (Step S73).

Then, the migration source determining unit 144 determines whether the number of components (the number of virtual machines) of the selected candidate move combination is the minimum (Step S74). If it is determined that the number of components (the number of virtual machines) of the selected candidate move combination is the minimum (Yes at Step S74), the migration source determining unit 144 specifies this combination as the move combination (Step S75). Then, the migration source determining unit 144 proceeds to Step S72 in order to select a candidate move combination that has not been selected.

In contrast, if it is determined that the number of components (the number of virtual machines) of the selected candidate move combination is not the minimum (No at Step S74), the migration source determining unit 144 proceeds to Step S72 in order to select a candidate move combination that has not been selected.

At Step S72, if it is determined that all of the candidate move combinations have been selected (Yes at Step S72), the migration source determining unit 144 ends the process for specifying the move combination of the virtual machines.

Figure 23:
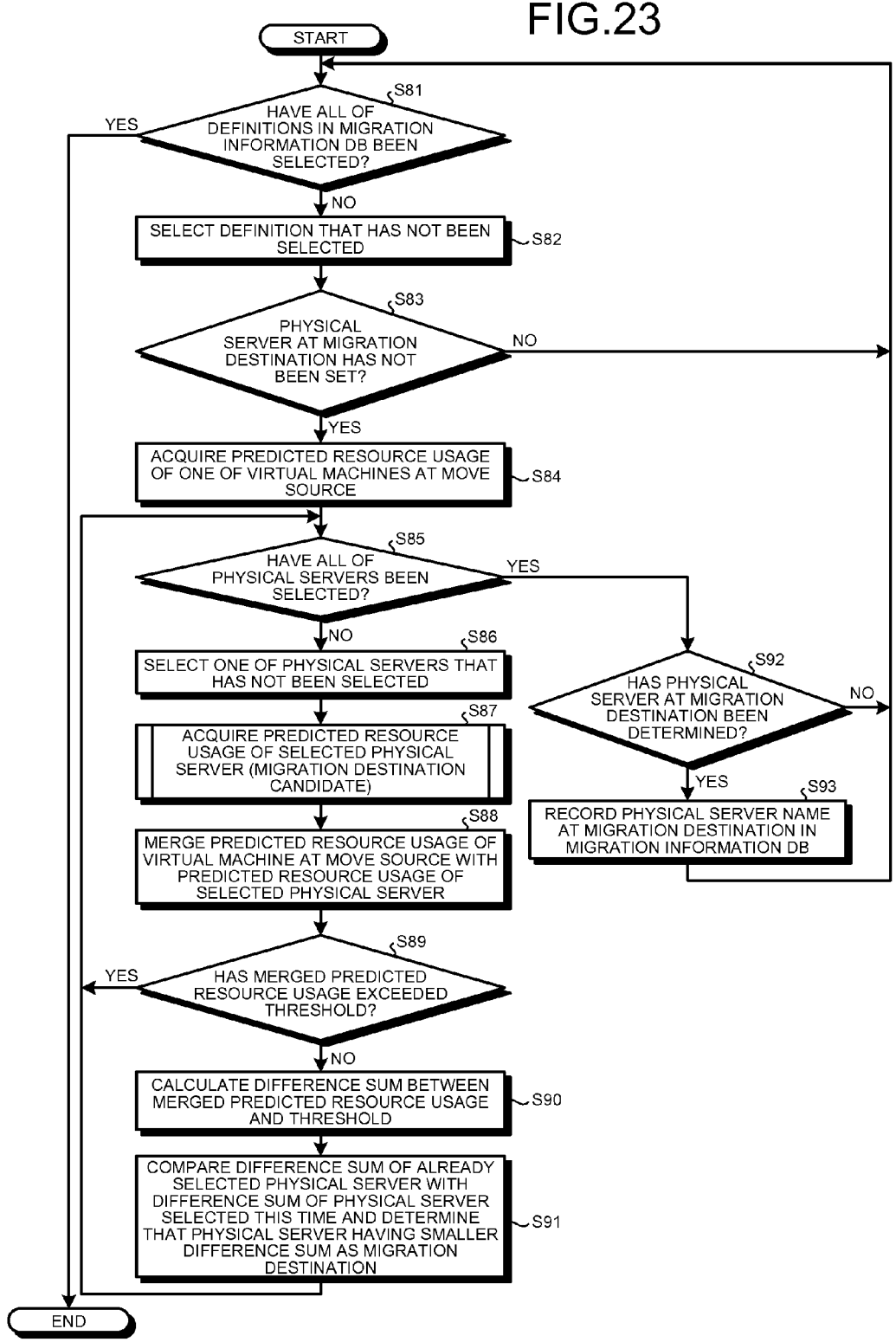
FIG. 23 is a flowchart illustrating the flow of a migration destination determination process according to the embodiment.

Flow of the Migration Destination Determination Process Performed by the Migration Control Unit FIG. 23 is a flowchart illustrating the flow of a migration destination determination process according to the embodiment.

The migration destination determining unit 145 called by the main processing unit 141 determines whether all of the definitions (records) in the migration information DB 114 have been selected (Step S81). If it is determined that not all of the definitions in the migration information DB 114 have been selected (No at Step S81), the migration destination determining unit 145 selects a definition that has not been selected (Step S82).

Then, for the selected definition, the migration destination determining unit 145 determines whether the physical server 2 at the migration destination has not been set (Step S83). If it is determined that the physical server 2 at the migration destination is not a not-yet set server, i.e., the physical server 2 at the migration destination has been set (No at Step S83), the migration destination determining unit 145 proceeds to Step S81 in order to select a definition that has not been selected. In contrast, if it is determined that the physical server 2 at the migration destination has not been set (Yes at Step S83), the migration destination determining unit 145 acquires, from the virtual-machine predicted information table 1121, the predicted resource usage of one of the virtual machines 22 at the move source (Step S84).

Subsequently, the migration destination determining unit 145 determines whether all of the physical servers have been selected (Step S85). If it is determined that not all of the physical servers have been selected (No at Step S85), the migration destination determining unit 145 selects one of the physical servers 2 that has not been selected (Step S86). Then, the migration destination determining unit 145 acquires the predicted resource usage of the selected physical server 2 (migration destination candidate) (Step S87).

Then, the migration destination determining unit 145 merges the predicted resource usage of the virtual machine 22 at the move source with the predicted resource usage of the selected physical server 2 (Step S88). Then, the migration destination determining unit 145 determines whether the merged predicted resource usage has exceeded the threshold (Step S89). If it is determined that the merged predicted resource usage has not exceeded the threshold (No at Step S89), the migration destination determining unit 145 calculates the difference sum between the merged predicted resource usage and the threshold (Step S90).

Then, the migration destination determining unit 145 compares the difference sum of the already selected physical server 2 with the difference sum of the physical server 2 that is selected this time and then determines that the physical server 2 having the smaller difference sum as the migration destination (Step S91). Then, the migration destination determining unit 145 proceeds to Step S85 in order to select a physical server that has not been selected.

In contrast, if it is determined that the merged predicted resource usage has exceeded the threshold (Yes at Step S89), the migration destination determining unit 145 excludes the selected physical server 2 from the migration destination. Then, the migration destination determining unit 145 proceeds to Step S85 in order to select a physical server that has not been selected.

At Step S85, if it is determined that all of the physical servers have been selected (Yes at Step S85), the migration destination determining unit 145 determines whether the physical server 2 at the migration destination has been determined (Step S92). If it is determined that the physical server 2 at the migration destination has not been determined (No at Step S92), the migration destination determining unit 145 proceeds to Step S81 in order to select a definition that has not been selected.

In contrast, if it is determined that the physical server 2 at the migration destination has been determined (Yes at Step S92), the migration destination determining unit 145 records the physical server name at the migration destination in the migration information DB 114 (Step S93). Then, the migration destination determining unit 145 proceeds to Step S81 in order to select a definition that has not been selected.

At Step S81, if it is determined that all of the definitions in the migration information DB 114 are selected (Yes at Step S81), the migration destination determining unit 145 ends the migration destination determination process.

Figure 24:
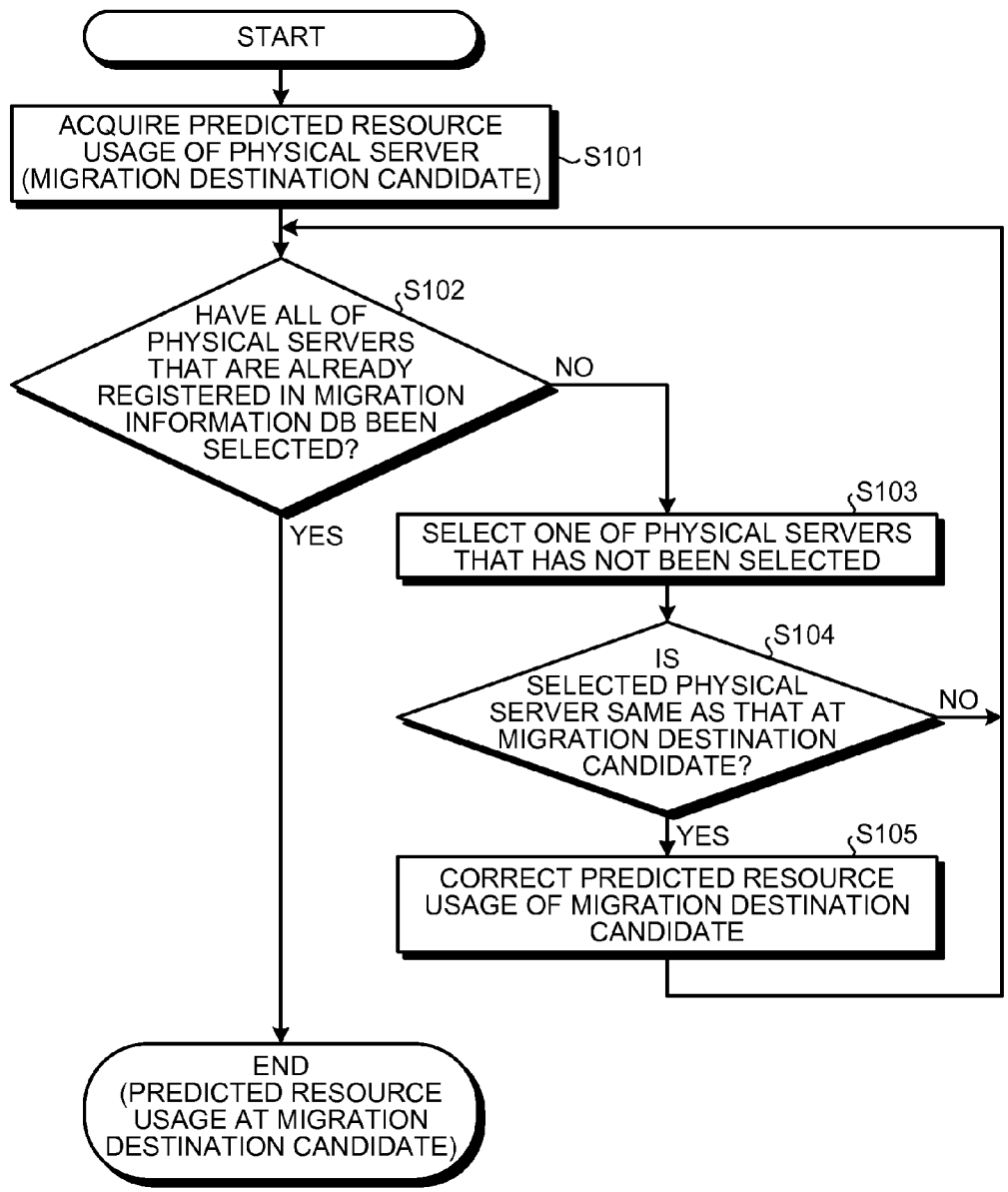
FIG. 24 is a flowchart illustrating the flow of a process for acquiring predicted resource usage of a physical server.

In the following, the process performed at S87 illustrated in FIG. 23 will be described with reference to FIG. 24. FIG. 24 is a flowchart illustrating the flow of a process for acquiring the predicted resource usage of a physical server.

The migration destination determining unit 145 acquires, from the physical-server predicted information table 1122, the predicted resource usage of a physical server (migration destination candidate) (Step S101).

Subsequently, the migration destination determining unit 145 determines whether all of the physical servers 2 that are already registered in the migration destination physical server name 114d in the migration information DB 114 have been selected (Step S102). If it is determined that not all of the physical servers 2 that are already registered in the migration information DB 114 have been selected (No at Step S102), the migration destination determining unit 145 selects one of the physical servers 2 that has not been selected (Step S103).

Then, the migration destination determining unit 145 determines whether the selected physical server 2 is the same as that at the migration destination candidate (Step S104). If it is determined that the selected physical server 2 is the same as that at the migration destination candidate (Yes at Step S104), the migration destination determining unit 145 corrects the predicted resource usage of the migration destination candidate (Step S105). Specifically, the migration destination determining unit 145 merges the acquired predicted resource usage of the physical server 2 at the migration destination candidate with the predicted resource usage of the virtual machine 22 that has already been registered in the migration information DB 114 and that is to be moved to the target physical server 2. Then, the migration destination determining unit 145 proceeds to Step S102 in order to select one of the physical servers 2 that has not been selected.

In contrast, if it is determined that the selected physical server 2 is not the same physical server as that at the migration destination candidate (No at Step S104), the migration destination determining unit 145 proceeds to Step S102 in order to select one of the physical servers 2 that has not been selected.

At Step S102, if it is determined that all of the physical servers 2 that are already registered in the migration information DB 114 have been selected (Yes at Step S102), the migration destination determining unit 145 returns the predicted resource usage at the migration destination candidate to the migration source.

Figure 25:
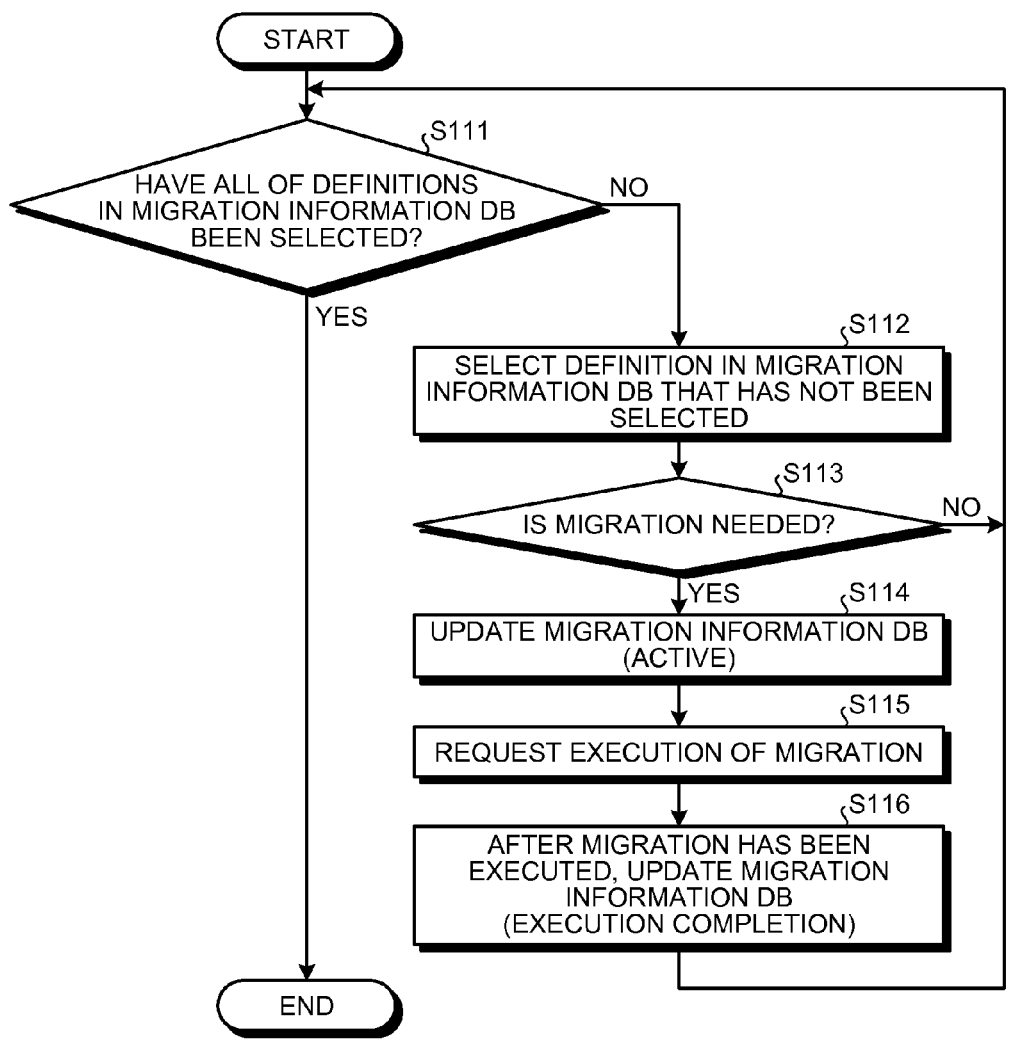
FIG. 25 is a flowchart illustrating the flow of a migration execution requesting process according to the embodiment.

Flow of the migration execution requesting Process Performed by the Migration Control Unit FIG. 25 is a flowchart illustrating the flow of a migration execution requesting process according to the embodiment.

The migration execution requesting unit 146 called by the main processing unit 141 determines whether all of the definitions (records) in the migration information DB 114 have been selected (Step S111). If it is determined that not all of the definitions in the migration information DB 114 have not been selected (No at Step S111), the migration execution requesting unit 146 selects a definition in the migration information DB 114 that has not been selected (Step S112).

Subsequently, for the selected definition, the migration execution requesting unit 146 determines whether a migration is needed (Step S113). Specifically, for the selected definition, the migration execution requesting unit 146 determines whether the migration date and time 114a have elapsed and the execution state 114e is "pre-execution". If the migration date and time 114a have elapsed and the execution state 114e is "pre-execution", the migration execution requesting unit 146 determines that a migration is needed.

If it is determined that a migration is needed (Yes at Step S113), the migration execution requesting unit 146 updates, for the selected definition, the execution state 114e in the migration information DB 114 to "active" (Step S114). Then, the migration execution requesting unit 146 requests the execution of a migration from the hypervisor 21 for the virtual machine 22 at the migration source and requests the execution of a migration from the hypervisor 21 in the physical server 2 at the migration destination (Step S115).

After the migration has been executed, for the definition that is migrated normally or that has been selected, the migration execution requesting unit 146 updates the execution state 114e in the migration information DB 114 to "execution completion" (Step S116). Furthermore, if the migration is abnormal, the migration execution requesting unit 146 updates, for the selected definition, the execution state 114e in the migration information DB 114 to "non-completion". Then, the migration execution requesting unit 146 proceeds to Step S111 in order to select the definition that has not been selected.

At Step S113, if it is determined that a migration is not needed, the migration execution requesting unit 146 proceeds to Step S111 in order to select a definition that has not been selected.

At Step S111, if it is determined that all of the definitions in the migration information DB 114 have been selected (Yes at Step S111), the migration execution requesting unit 146 ends the migration execution requesting process.

Advantage of the Embodiment

According to the embodiment described above, the management server 1 predicts a resource shortage, predicted to occur for a predetermined time period, in the physical server 2 that includes multiple virtual machines 22. Then, the management server 1 specifies the virtual machines 22 that can eliminate the resource shortage by moving, at the time point at which the predicated resource shortage occurs, the virtual machines 22 included in the physical server 2, for which the resource shortage is predicted, to another physical server 2. Then, on the basis of the resource usage of the specified virtual machines 22 for the predetermined time period and the time point that is associated with the resource usage, the management server 1 moves the specified virtual machines 22 to the other physical server 2. With this configuration, the management server 1 can eliminate a resource shortage at a time point at which the resource shortage of the physical server 2 is predicted. Consequently, it possible to prevent the operation of the target physical server 2 from being unstable.

Furthermore, according to the embodiment described above, if a resource shortage is eliminated by moving multiple virtual machines 22, the management server 1 specifies a move combination of the virtual machines 22 such that the number of the multiple virtual machines 22 with which the resource shortage can be eliminated is the minimum. With this configuration, because the management server 1 specifies the move combination of the virtual machines 22 such that the number of the multiple virtual machines 22 with which the resource shortage can be eliminated is the minimum, it is possible to promptly move the virtual machines 22 of the specified move combination to the other physical server 2. Consequently, the management server 1 can minimize the effect on a task at the time of moving.

Furthermore, according to the embodiment described above, if there are multiple move combinations, the management server 1 specifies a move combination that includes the virtual machine 22 that has the earliest time point at which the resource usage thereof is at a minimum before a resource shortage occurs in the physical server 2 for which a resource shortage is predicted. With this configuration, the management server 1 can safely move the virtual machines 22 included in the specified move combination before the resource shortage occurs in the physical server 2 for which the resource shortage is predicted.

Furthermore, according to the embodiment described above, the management server 1 moves the virtual machines 22 to the other physical server 2 at the time point at which the resource usage of the virtual machines 22 that are specified to be moved is at a minimum. With this configuration, the management server 1 can promptly move the virtual machines 22 specified to be moved to the other physical server 2. Consequently, the management server 1 can minimize the effect on a task at the time of moving.

Furthermore, according to the embodiment described above, the management server 1 determines, as the move destination, the physical server 2 whose resource usage after the virtual machines 22 specified to be moved are moved does not exceed the upper limit that the resource shortage is determined to be and whose resource usage is the closest to the upper limit. Then, the management server 1 moves the virtual machines 22, which are specified to be moved, to the determined move destination. With this configuration, if the management server 1 moves the virtual machines 22, which are specified to be moved, to the physical server 2 that is determined as the move destination, the resource of the physical server 2 at the move destination can be efficiently used.

Program, etc.

Furthermore, the management server 1 can be implemented by installing the functions of units described above, such as the migration control unit 14 and the storing unit 11, in an information processing apparatus, such as a known personal computer and a workstation.

The components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions. For example, the migration control unit 14, the performance information collecting unit 12, and the configuration information collecting unit 13 may also be integrated as a single unit. In contrast, the migration source determining unit 144 may also be separated by dividing it into a specifying unit that specifies move combinations and a using unit that uses an optimum move combination from among the specified move combination. Furthermore, the storing unit 11, such as the performance information DB 111, may also be an external unit of the management server 1 and connected via a network.

The various processes described in the embodiments can be implemented by a program prepared in advance and executed by a computer such as a personal computer or a workstation. Accordingly, in the following, a computer that executes migration control program having the same function as that performed by the management server 1 illustrated in FIG. 2 will be described. FIG. 26 is a block diagram illustrating an example of a computer that executes a migration control program.

As illustrated in FIG. 26, a computer 200 includes a CPU 203 that executes various arithmetic processing, an input device 215 that receives an input of data from a user, and a display control unit 207 that controls a display 209. Furthermore, the computer 200 includes a disk drive 213 that reads a program or the like from a storage medium, and a communication control unit 217 that receives/transmits data between other computers via a network. Furthermore, the computer 200 includes a memory 201 that temporarily stores therein various kinds of information and an HDD 205. The memory 201, the CPU 203, the HDD 205, the display control unit 207, the disk drive 213, the input device 215, and the communication control unit 217 are connected via a bus 219.

The disk drive 213 is, for example, a device used for a removable disk 211. The HDD 205 stores therein a migration control program 205a, a performance information collection program 205b, a configuration information collection program 205c, and migration control related information 205d.

The CPU 203 reads the migration control program 205a and loads it in the memory 201. The migration control program 205a functions as a migration control process 201a. Furthermore, the CPU 203 reads the performance information collection program 205b and loads it in the memory 201. The performance information collection program 205b functions as a performance information collection process 201b. Furthermore, the CPU 203 reads the configuration information collection program 205c and loads it in the memory 201. The configuration information collection program 205c functions as a configuration information collection process 201c.

The migration control process 201a, for example, corresponds to each of the functioning units in the migration control unit 14. The performance information collection process 201b corresponds to the performance information collecting unit 12. The configuration information collection process 201c corresponds to the configuration information collecting unit 13. The migration control related information 205d corresponds to the performance information DB 111, the predicted performance information DB 112, the configuration information DB 113, and the migration information DB 114.

Furthermore, each of the programs 205a, 205b, and 205c does not always need to be stored in the HDD 205 from the beginning. For example, each program may be stored in a "portable physical medium", such as a flexible disk (FD), a CD-ROM, a DVD disk, a magneto-optic disk, or an IC card, that is to be inserted into the computer 200. Then, the computer 200 may read and execute each of the programs 205a, 205b, and 205c from the portable physical medium.

According to an aspect of a program disclosed in the present invention, it is possible to prevent the operation of a physical server for which the resource usage is predicted from being unstable in the future.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable storage medium having stored therein a program causing a computer to execute a process comprising:

predicting a resource shortage of a first physical machine for a specific time period, the first physical machine operating a plurality of virtual machines, the resource shortage indicating that a resource usage by the first physical machine exceeds, at a time within the specific time period, an upper limit specified for the first physical machine, wherein the resource usage is predicted at a time during the specific time period;

determining combinations of virtual machines from among the plurality of virtual machines, the predicted resource shortage being avoided by moving any of the determined combinations from the first physical machine to a second physical machine, and first specifying combinations each including a minimum number of virtual machines among the determined combinations;

second specifying a combination from among the combinations specified at the first specifying, wherein a time for the combination, that precedes a time when the predicted resource shortage occurs, and when a resource usage by the combination is predicted to be a minimum during the specific time period, is earlier than times for other first specified combinations; and moving the combination to the second physical machine at the time during the specific time period when the resource usage by the combination is predicted to be the minimum.

2. The non-transitory computer readable storage medium according to claim 1, wherein the moving includes:

determining a destination physical machine, wherein a sum resource usage that is a sum of a resource usage by the destination physical machine and a resource usage by the second specified combination predicted at a time during the specific time period does not exceed an upper limit for operating a plurality of virtual machines on the destination physical machine, and the sum resource usage by the destination physical machine over the specific time period is larger than that by another destination physical machine; and moving the combination to the destination physical machine that is determined at the determining.

3. A management server comprising:

a processor; and a memory, wherein the processor executes:

predicting a resource shortage of a first physical machine for a specific time period, the first physical machine including a plurality of virtual machines, the resource shortage indicating that a resource usage by the first physical machine exceeds, at a time within the specific time period, an upper limit specified for the first physical machine, wherein the resource usage is predicted at a time during the specific time period;

determining combinations of virtual machines from among the plurality of virtual machines, the predicted resource shortage being avoided by moving any of the determined combinations from the first physical machine to a second physical machine, and first specifying combinations each including a minimum number of virtual machines among the determined combinations;

second specifying a combination from among the combinations specified at the first specifying, wherein a time for the combination, that precedes a time when the predicted resource shortage occurs, and when a resource usage by the combination is predicted to be a minimum during the specific time period, is earlier than times for other first specified combinations; and moving the combination to the second physical machine at the time during the specific time period when the resource usage by the combination is predicted to be the minimum.

4. A virtual machine move control method executed by a processor, the virtual machine move control method comprising:

predicting a resource shortage of a first physical machine for a specific time period, the first physical machine including a plurality of virtual machines, the resource shortage indicating that a resource usage by the first physical machine exceeds, at a time within the specific time period, an upper limit specified for the first physical machine, wherein the resource usage is predicted at a time during the specific time period;

determining combinations of virtual machines from among the plurality of virtual machines, the predicted resource shortage being avoided by moving any of the determined combinations from the first physical machine to a second physical machine, and first specifying combinations each including a minimum number of virtual machines among the determined combinations;

second specifying a combination from among the combinations specified at the first specifying, wherein a time for the combination, that precedes a time when the predicted resource shortage occurs, and when a resource usage by the combination is predicted to be a minimum during the specific time period, is earlier than times for other first specified combinations; and moving the combination to the second physical machine at the time during the specific time period when the resource usage by the combination is predicted to be the minimum.

* * * * *